(12) United States Patent
Crosby et al.

(10) Patent No.: US 12,523,490 B2
(45) Date of Patent: Jan. 13, 2026

(54) SYSTEMS AND METHODS FOR VEHICLE NAVIGATION

(71) Applicant: CSAA Insurance Services, Inc., Walnut Creek, CA (US)

(72) Inventors: Jed Crosby, Walnut Creek, CA (US); Beti Cung, San Francisco, CA (US); Kelly Lau, San Ramon, CA (US)

(73) Assignee: CSAA Insurance Services, Inc., Walnut Creek, CA (US)

( * ) Notice: Subject to any disclaimer, the term of this patent is extended or adjusted under 35 U.S.C. 154(b) by 181 days.

(21) Appl. No.: 17/380,796

(22) Filed: Jul. 20, 2021

(65) Prior Publication Data

US 2023/0025772 A1 Jan. 26, 2023

(51) Int. Cl.
| | |
|---|---|
| *G01C 21/36* | (2006.01) |
| *G01C 21/28* | (2006.01) |
| *G06F 3/0484* | (2022.01) |
| *G06N 20/00* | (2019.01) |
| *G06Q 40/08* | (2012.01) |
| *G07C 5/00* | (2006.01) |

(52) U.S. Cl.
CPC ......... *G01C 21/3694* (2013.01); *G01C 21/28* (2013.01); *G01C 21/3697* (2013.01); *G06F 3/0484* (2013.01); *G06N 20/00* (2019.01); *G06Q 40/08* (2013.01); *G07C 5/008* (2013.01)

(58) Field of Classification Search
CPC .............. G01C 21/3694; G01C 21/28; G01C 21/3697; G01C 21/3492; G01C 21/3667; G01C 21/3461; G06F 3/0484; G06N 20/00; G06Q 40/08; G06Q 10/02; G06Q 10/047; G06Q 30/0283; G06Q 50/30; G07C 5/008
See application file for complete search history.

(56) References Cited

U.S. PATENT DOCUMENTS

| | | | |
|---|---|---|---|
| 9,574,888 B1 | 2/2017 | Hu | |
| 10,699,347 B1 * | 6/2020 | Slusar | G01C 21/3461 |
| 11,599,951 B1 * | 3/2023 | Gross | G09B 19/00 |
| 2012/0123806 A1 | 5/2012 | Schumann | |

(Continued)

OTHER PUBLICATIONS

International Preliminary Report on Patentability for International application No. PCT/US2022/037151 dated Jan. 18, 2024, 11 pages.

*Primary Examiner* — Anne Marie Antonucci
*Assistant Examiner* — Jewel A Kuntz
(74) *Attorney, Agent, or Firm* — McDonnell Boehnen Hulbert & Berghoff LLP

(57) ABSTRACT

In one aspect, an example method includes: (a) collecting sensor data from one or more vehicles operating within a geographic region and environmental data for the geographic region; (b) generating an accident risk model using one or more machine learning models; (c) receiving a request for navigating between a first geographic position and a second geographic position; (d) identifying attributes of one or more routes between the first geographic position and the second geographic position and through the geographic region, wherein the identified attributes of the one or more routes are based on at least the generated accident risk model; and (e) transmitting an instruction that causes a mobile computing device to display a graphical indication of: (i) the one or more routes; and (ii) the identified attributes of the one or more routes.

22 Claims, 11 Drawing Sheets

(56) References Cited

U.S. PATENT DOCUMENTS

| | | |
|---|---|---|
| 2015/0112504 A1* | 4/2015 | Binion .................. G07C 5/008 |
| | | 701/1 |
| 2016/0171521 A1 | 6/2016 | Ramirez |
| 2016/0189303 A1* | 6/2016 | Fuchs .................... G06Q 40/08 |
| | | 705/4 |
| 2016/0189311 A1* | 6/2016 | Erickson ............ G01C 21/3407 |
| | | 705/4 |
| 2017/0241791 A1* | 8/2017 | Madigan ................ G06Q 40/08 |
| 2018/0075309 A1* | 3/2018 | Sathyanarayana ... G05D 1/0055 |
| 2020/0408540 A1* | 12/2020 | Schreier ............. G01C 21/3679 |

\* cited by examiner

SYSTEMS AND METHODS FOR VEHICLE NAVIGATION

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system for navigation system configured for use with a vehicle is disclosed. The example computing system comprises a modeling computing device, wherein the modeling computing device comprises a processor and a non-transitory computer-readable medium, having stored thereon program instructions that, upon execution by the processor, cause the modeling computing device to perform a set of operations comprising: (a) collecting sensor data from one or more vehicles operating within a geographic region and environmental data for the geographic region; (b) generating an accident risk model using one or more machine learning models, wherein the one or more machine learning models are configured to generate the accident risk model using the collected sensor data and environmental data, and wherein the accident risk model indicates, for each of multiple areas within the geographic region, a respective accident risk of operating the vehicle within the area; (c) receiving a request for navigating between a first geographic position and a second geographic position; and (d) based on the received request, identifying attributes of one or more routes between the first geographic position and the second geographic position and through the geographic region, wherein the identified attributes of the one or more routes are based on at least the generated accident risk model. The example computing system further comprises a mobile computing device, wherein the mobile computing device comprises a processor and a non-transitory computer-readable medium, having stored thereon program instructions that, upon execution by the processor, cause the mobile computing device to perform a set of operations comprising: (a) receiving, from the modeling computing device, the identified attributes of the one or more routes; and (b) displaying, via a user interface of the mobile computing device, a graphical indication of: (i) the one or more routes; and (ii) the identified attributes of the one or more routes.

In another aspect, an example method is disclosed. The method includes (a) collecting, by a modeling computing device, sensor data from one or more vehicles operating within a geographic region and environmental data for the geographic region; (b) generating, by the modeling computing device, an accident risk model using one or more machine learning models, wherein the one or more machine learning models are configured to generate the accident risk model using the collected sensor data and environmental data, and wherein the accident risk model indicates, for each of multiple areas within the geographic region, a respective accident risk of operating the vehicle within the area; (c) receiving, by the modeling computing device, a request for navigating between a first geographic position and a second geographic position; (d) based on the received request, identifying, by the modeling computing device, attributes of one or more routes between the first geographic position and the second geographic position and through the geographic region, wherein the identified attributes of the one or more routes are based on at least the generated accident risk model; and transmitting by the modeling computing device, an instruction that causes a mobile computing device to display a graphical indication of: (i) the one or more routes; and (ii) the identified attributes of the one or more routes.

DETAILED DESCRIPTION

I. Overview

Figure 1:
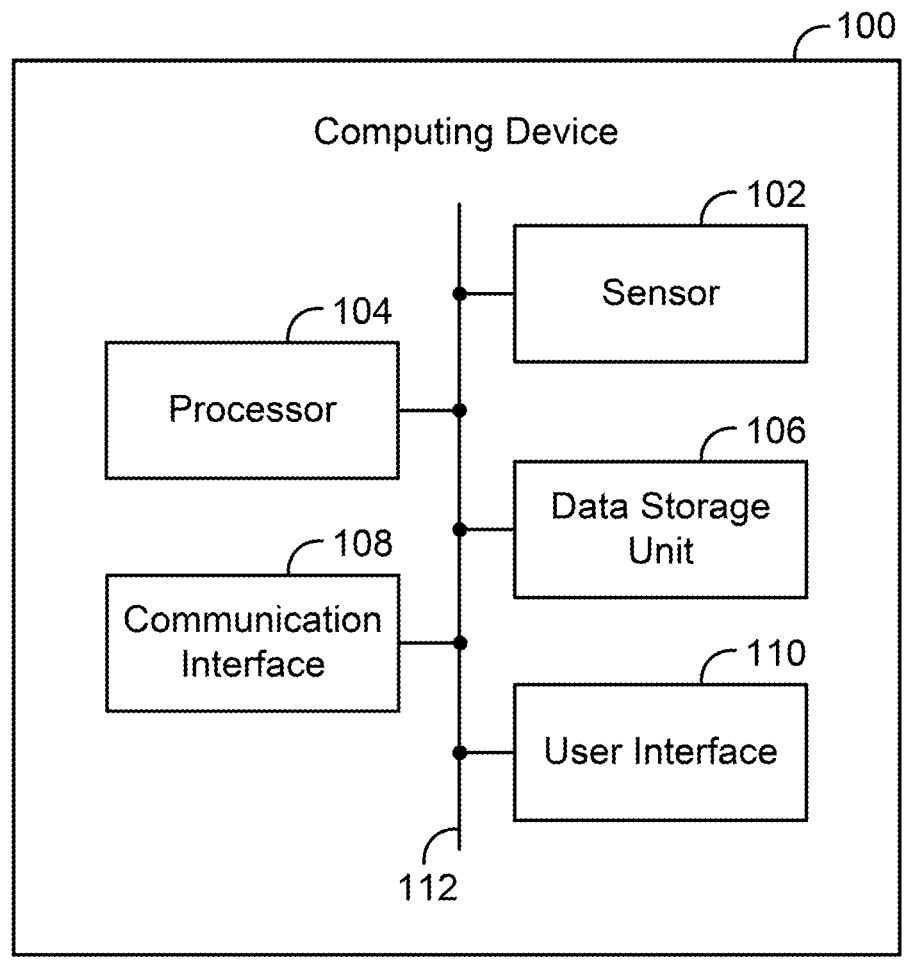
FIG. 1 is a simplified block diagram of an example computing device.

Transportation technologies have evolved at an almost meteoric pace over the past decade. Nevertheless, insurance companies are regularly required to evaluate potential premiums for insurance policies associated with these transportation technologies.

Conventionally, insurance companies considered numerous factors in connection with insurance premiums for transportation technologies, including, for example, a driver's accident history, the make, model, and type of a motor vehicle to be insured, and other such factors. However, the advent of autonomous and semi-autonomous vehicles, ride-sharing platforms, and the ever-increasing number of sensors equipped on motor vehicles have changed the landscape of accurately evaluating accident prevention and driver safety, as well as premiums for and performance under insurance policies associated with these vehicles. For example, by relying on conventional methods, policy holders, insurance companies, and others it is often difficult to accurately determine the accident risk that various types of vehicles and operators face, much less verify in real-time.

If, however, the insurance company could provide an efficient, effective, and novel solution for modeling accident risk based on leveraging existing and evolving transportation technologies, then the overall accident risk associated with operating a vehicle in that specific geographic region (and others) would be reduced and insurance premiums could be more accurately forecasted. Further, this improvement would benefit operators and passengers of autonomous and semi-autonomous vehicles, ride-sharing platforms, and traditional motor vehicles, alike. Put another way, if the accident risk associated with evolving transportation technologies could be determined more comprehensively, intelligently, and accurately, then the safety and well-being of all parties involved would improve.

Accordingly, features of the present disclosure can help to address these and other issues to provide an improvement to select technical fields. More specifically, features of the present disclosure help address issues within and provide improvements for select technical fields, which include for example, computer-based systems for collecting and analyzing data from vehicle sensors, environment sensors, mobile computing devices, and/or other sources, modeling accident risk within one or more geographic areas based on this data, providing navigation instructions that reduce accident risk, providing analysis and incentives for improving driver behavior, and computing devices, applications, and graphical user interfaces (GUIs) used by insurance customers and policyholders, as well as other entities.

Embodiments of the present invention provide methods, systems, and devices that allow insurance policy holders and insurance companies to effectively analyze, determine, and display attributes (e.g., accident risk) associated with operating a vehicle and/or being a passenger in a vehicle within one or more geographic regions and/or at various times.

More specifically, example embodiments relate to methods, systems, and devices that allow navigation system configured for use with a vehicle to assess various attributes associated with navigating one or more routes between first and second geographic positions by leveraging one or more transportation technologies (e.g., sensor data associated with one or more autonomous and semi-autonomous vehicles operating within a geographic region, environmental data for the geographic region, etc.). In a further aspect, these example embodiments also implement different means of analyzing and conveying the results of this analysis (e.g., displaying a map indicating the accident risk of navigating between one or more routes between the first and second geographic position).

To facilitate this determination and the potential responsive actions taken by the navigation system, the navigation system may use one or more components to carry out various steps of this process. For example, the navigation system may include a modeling computing device (e.g., a cloud-based computing device that receives data from a number of sources and uses a machine learning model to create one or more models based on the received data) and a mobile computing device (e.g., a smartphone associated with a vehicle operator and/or passenger). These computing devices can be used to perform various operational functions within the navigation system to determine and display various attributes associated with navigating one or more routes between a first geographic position and a second geographic position.

In some examples, the modeling computing device may collect data and may do so from a number of sources. For example, the modeling computing device may collect sensor data from one or more sensors on one or more vehicles operating within a geographic region. This sensor data may include data from autonomous and semi-autonomous vehicles, as well as one or more sensors equipped on other types of vehicles operating within the geographic region.

In example embodiments, these vehicle sensors may include: (i) GPS sensors (e.g., to determine a geographic location of the vehicle); (ii) accelerometer sensors (e.g., to determine speed and/or direction of the vehicle); (iii) weather sensors (e.g., to determine the temperature, presence and extent of rain/snow, and/or humidity in and around the vehicle); (iv) collision sensors (e.g., to determine if the vehicle has been involved in a collision); and (v) camera sensors (e.g., to determine various aspects of the vehicle's surroundings and/or conditions inside the vehicle), among other possibilities.

For example, the vehicle sensor data may also be used to indicate the make, model, operational status, and/or operating condition of the vehicle (e.g., sensors on the vehicle that detect air pressure in the vehicle's tires and/or other information about the vehicle indicating how road-worthy the vehicle is at a given moment in time). In a further aspect, depending on the make, model, condition, and/or operational status of the vehicle, the accident risk associated with operating the vehicle may be adjusted, particularly in light of other environmental data collected by the modeling computing device.

In other examples, the modeling computing device may collect environmental data associated a geographic region from one or more resources. This data may include data from public and/or private databases associated with the geographic region, as well as other sensors and resources associated with the geographic region.

In example embodiments, this environmental data associated with the geographic region may include: (i) weather data (e.g., from a public and/or private weather database or website, various sensors or other mechanisms associated with the geographic region that determine the weather conditions in and around the geographic region and/or areas within the geographic region, etc.); (ii) traffic data (e.g., from a public and/or private traffic database or website, various platforms that determine the traffic conditions in and around the geographic region and/or areas within the geographic region); (iii) accident data (e.g., from a public and/or private service that monitors whether and to what extent vehicular accidents have occurred in and around the geographic region and/or areas within the geographic region); (iv) time data (e.g., timestamp data that indicates the time at which other environmental data and/or vehicle sensor data was collected, events occurred, etc.); (v) map data (e.g., from a public and/or private map database or website (UBER®, MAPQUEST®, etc.)); (vi) road condition data (e.g., from a public and/or private database or website that monitors and/or stores data concerning road conditions, closures, construction, etc.); and (vii) camera data (e.g., from one or more cameras operating within the geographic region and/or areas within the geographic region), among other possibilities.

In example embodiments, once the modeling computing device collects sensor data from one or more vehicles and environmental data for the geographic region, the modeling computing device may also generate and maintain one or more resources to interpret this data (e.g., one or more resources securely stored on a server and/or database associated with the modeling computing device and/or insurance company). For example, the modeling computing device may use one or more machine learning models to interpret this data and generate one more models based on this collected data.

In an example embodiment, the modeling computing device may generate a model that approximates the level of accident risk of operating a vehicle within a geographic region and/or for each of multiple areas within the geographic region (e.g., on one or more roads within a geographic region). To generate this accident risk model, the modeling computing device may use one or more machine learning models and/or sources of information for the one or more machine learning models.

For example, the modeling computing may use vehicle sensor data and environmental data from a geographic region to utilize and/or train a naïve Bayes classifier machine learning model to generate an accident risk model that indicates a respective accident risk of operating a vehicle within the geographic region (or areas within the geographic region). To facilitate this process, the modeling computing device could use the following example model, according to $$\text{Bayes' Theorem}\left(P(A \mid B) = \frac{P(B \mid A)P(A)}{P(B)}\right).$$

For example, assume that "A" is data indicating an event that an accident occurs in a mile of driving a vehicle. In a further aspect, assume, for example, that "B" is data indicating the set of road conditions that applied at the time of the accident. In an example embodiment, the above assumptions applied to Bayes' Theorem can be used to calculate the probability (P(A|B)) that an accident (A) will occur during a mile of driving given a particular set of road conditions (B) is equal to the probability (P(A)) that an accident might occur during any mile of driving, times the probability (P(B|A)) that the road conditions (B) would be present (should there be an accident), divided by the probability (P(B)) that the road conditions (B) would be observed while driving a randomly selected mile of road.

In a further aspect, one or more of the variables described above may be additionally or alternatively defined or interpreted as: (i) P(A), the general probability of having an accident during a mile of driving; (ii) P(B), the probability of seeing road conditions (B) in a randomly selected mile of road (e.g., the total number of miles of road in the United States with road conditions (B) divided by the total miles of road in the United States); and (iii) P(B|A), the probability of observing road conditions (B) given that there was an accident. Further, as described in further detail above, data from one or more sources can further inform and/or improve these definitions and/or analysis (e.g., historical accident data, road condition data, and/or weather data within a geographic region). Other examples are possible.

For example, if the modeling computing device cannot locate road conditions (B) for a given an accident probability (P(A|B)) from any source (e.g., a database of historical accident data), then one or more naïve assumptions may be used to facilitate generating the accident risk model. For example, data concerning road conditions (B) may be organized as a list, or vector, of categorical information: B=(is_icy=false, is_foggy=true, is_highway=true, speed limit over 55=true, . . . N). In some examples, one or more of these categories of road conditions (B) are independent from one another. However, in other examples, one or more these categories may not be independent from one another (e.g., fog and ice may both be correlated with high humidity). In some embodiments, to improve the accuracy of the accident risk model, an independence assumption may be applied to a naïve Bayes classifier to estimate P(B|A) given the frequency of each individual road condition across accidents opposed to the particular combinations of accident road conditions actually observed, i.e., P(B|A)=P(is_icy=false|A)×P(is_foggy=true|A)×P(is_highway=true|A) × . . . P(N)). In this regard, the modeling computing device may use individual road condition frequencies to compute P(B|A) and thereby also compute P(A|B) for the road conditions (B) for any segment of road, even if: (i) there is no accident data for a particular segment of road; and/or (ii) there is no data indicating particular road conditions in conjunction with an accident. Furthermore, although various road conditions are discussed above, it should be noted that they are included only for illustrative purposes. For example, if a pair of co-occurring road conditions is highly predictive in combination (e.g., icy+foggy), they could be combined as a single condition (e.g., icy_foggy condition) for use with the naïve Bayes classifier. Other examples are possible.

For example, other models may improve the performance of the modeling computer device to more accurately leverage vehicle sensor data and environmental data to more accurately generate an accident risk model that indicates a respective accident risk of operating a vehicle within an area. These models may include one or more deep learning models, gradient boosting regression models, and many others. In a further aspect, a number of factors may influence which models (or combinations of models) are most appropriate at any given time. For example, different road conditions, traffic parameters, heavily traveled roads that have a lot of accidents (with large amounts of corresponding sensor and/or environmental data), may provide circumstances where other models are more appropriate (e.g., where there may be enough accident data that a Bayesian independence assumption is not required).

Once the modeling computing device generates the accident risk model, the modeling computing device may use the accident risk model in various ways. For example, the accident risk model may be used to determine various attributes associated with navigating one or more routes between first and second geographic positions within a geographic region. In a further aspect, the modeling computing device may receive a request for navigating between a first geographic position and a second geographic position, either or both of which may be within the geographic region corresponding to the accident risk model. This request may come from a computing device inside the geographic region (e.g., from a mobile computing device inside of a vehicle operating in the geographic region), among other possibilities (e.g., from a mobile computing device inside of a vehicle operating outside the geographic region).

In an example embodiment, based on the received request, the modeling computing device may also identify attributes of one or more routes between the first geographic position, the second geographic position, through the geographic region, and/or other potential geographic regions, among other possibilities. The identified attributes of the one or more routes may also be based on the accident risk model generated by the modeling computing device. These attributes may include, for example, the risk associated with navigating each of these one or more routes (e.g., that each of the one or more routes presents various levels of collision risk or other risk factors). These attributes may include, for example, the insurance premiums associated with navigating each of these one or more routes (e.g., that each of the one or more routes presents a different insurance premium cost or other insurance premium factors). Other examples are possible.

In a further aspect, the modeling computing device may continuously or periodically monitor further received requests and/or other information (e.g., updated geolocation information for a vehicle operating within the geographic region) in order to update the attributes, accident risk model, or both. The modeling computing device may also provide real-time and/or periodic analysis of the updated attributes (e.g., the updated risk associated with navigating each of these one or more routes while the vehicle is navigating between the first and second geographic positions). In this regard, the accident risk model may enable the insurance company to provide a number of different pricing and/or insurance models for the operator of the vehicle. For example, the accident risk model may allow the insurance company to provide an insurance premium for a single trip (i.e., a "per-trip insurance policy"). Such per-trip insurance policies could be beneficial for autonomous vehicles and/or ride-share platform drivers, both of which typically plan the route (e.g., via software) before navigating such routes. Similarly, per-trip insurance premiums could also be offered to consumers planning a long-distance road trip over one or more specific routes. Other examples are possible.

In a further aspect, the insurance premiums calculated prior to navigating such routes could be adjusted for any deviations from the plan. For example, because the modeling computing device may continuously or periodically monitor further received requests and/or other information in order to provide real-time and/or periodic analysis of the updated attributes, accident risk model, or both, the modeling computing device to adjust the insurance premium based on events that occur during navigation. For example, if the vehicle operator does not adhere to the route for which the insurance premium was calculated, the modeling computing device may analyze the accident risk associated with the new route and adjust the insurance premium accordingly. In this regard, the real-time and/or periodic analysis provided by the modeling computing device allows for several insurance premium models.

For example, the accident risk model may enable the insurance company to iteratively provide insurance premiums during a trip (i.e., a "pay-as-you-go insurance policy"). Such pay-as-you-go insurance policies could be beneficial for traditional, autonomous, and semi-autonomous vehicles, alike. For example, if the vehicle operator submits a deposit to the insurance company and/or authorizes the insurance company to charge a deposit account and/or credit card, then the modeling computing device could calculate and charge insurance premiums in real-time (or near real-time) based on recursive accident risk analysis during a trip. For example, because the modeling computing device may continuously or periodically monitor further received requests and/or other information in order to provide real-time and/or periodic analysis of the updated attributes, accident risk model, or both, the modeling computing device may calculate the insurance premium per section of road traversed during the trip and the insurance premiums may be charged to the operator of the vehicle as the vehicle traverses each section of road along the trip (i.e., as the vehicle cross sections of road defined by the accident risk model during a trip, the insurance premiums for the vehicle would add up and be charged to the operator (e.g., akin to the meter on a taxi)). In a further aspect, after a trip, unused portions of the insurance premium (e.g., a deposit) could be refunded and/or the insurance premium can be otherwise adjusted accordingly.

In another example, the accident risk model may be used to collect accident and loss data for vehicles that are not moving (e.g., parked vehicles) and use collected data to construct an accident risk model for stationary vehicles. In this regard, risks and/or insurance premiums may be generated for given interval of time that a vehicle is parked at a given location and the operator could be charged in advance or could be charged in a pay-as-you-go fashion as described above for moving vehicles. In a further aspect, the pay-as-you-go insurance policy model could include premiums for a vehicle both when the vehicle is moving and when the vehicle is stationary, thereby providing a real-time metered insurance service that would cover a vehicle at all times.

In a further aspect, although the accident risk model has been described above in connection with a vehicle navigation system, once constructed by the modeling computing device, the accident risk model may be used to analyze the risk and/or associated insurance premiums for a number of other use cases. For example, the accident risk model may be used to identify dangerous sections of road, even if no accidents have yet occurred there. In this regard, the accident risk model may be useful to municipalities and highway departments interested in improving road safety, as well as for roads that have been planned but not yet constructed (i.e., making it possible to adjust plans and improve safety in the road design phase).

In another example embodiment, the accident risk model may be used to analyze accident risk analysis for non-vehicle travel. For example, the accident risk model may be used to identify accident risk associated with walking traffic (or other non-vehicular traffic such as bicycles, etc.) and guide pedestrians away from paths which may be dangerous due to crime, fall danger, or other risk factors. Other examples are possible.

For example, in some example embodiments, the accident risk model may be used to analyze and compare accident risk analysis for different types of vehicle and non-vehicle travel, and the system may take one or more responsive actions based on that analysis and comparison. For example, the accident risk model may be used to identify accident risk associated with traversing one or more routes via walking traffic and compare the risk of walking along the one or more routes with the risk identified with driving along the one or more routes in a vehicle. In a further aspect, based on this comparison, the system may take one or more responsive actions, including displaying suggestion to the user to navigate the one or more routes based on the risk associated with each mode of transportation (e.g., "WALKING ALONG THE ROUTE IS NOT ADVISED AT THIS TIME, PLEASE DRIVE YOUR VEHICLE") and/or consider alternative transportations altogether (e.g., "PLEASE CONSIDER TAKING THE TRAIN TO YOUR DESIRED DESTINATION"), as an alternative transportation may be a safer course of action along the one or more routes. Other examples are possible.

In yet another example embodiment, the modeling computing device may store the accident risk model and/or data associated with the accident risk model for further analysis in the future. For example, the modeling computing device may store and then use one or more previously generated accident risk models to more accurately construct an accident risk model at a given moment in time by determining historical risk conditions for one or more routes and/or one or more vehicles. The modeling computing device may do so based on a number of factors. For example, these factors may include periodic patterns (e.g., rush hour traffic during certain hours on weekdays) and/or environmental factors and/or forecast models (such as weather forecasts).

In one example, before an accident risk model is generated, the modeling computing device can compile and assess data and information in connection with previously generated accident risk models and use this data to begin generating a new accident risk model—i.e., recurrently generating accident risk models and/or analyzing the data associated therewith. There may be several advantages of recurrently performing this analysis, including ensuring that if a source on which the modeling computing system relies becomes unavailable (e.g., certain sensor data become unavailable), the modeling computing device will not lose the benefit of that data because it would have compiled and assessed this data previously, perhaps even over multiple iterations. In this way, the modeling computing device may also train a meta-machine learning risk model based on previously generated accident risk models and more accurately predict risks in real-time to generate more real-time accident risk models. Other examples are possible.

Turning back to the navigation system, the navigation system may also include a mobile computing device that interacts with the modeling computing device. The mobile computing device may also collect data and may do so from a number of sources. For example, the mobile computing device may collect data inside of one or more vehicles operating within a geographic region. This data may include data from one or more components of the mobile computing device, including microphones, GPS sensors, accelerometer sensors, time sensors, cameras, and/or device interaction sensor (e.g., a touchscreen of the mobile computing device that determines when a user engages with the mobile computing device), among other possibilities.

In a further aspect, the data collected by the mobile computing device may come from components of the mobile computing device (e.g., a GPS sensor on the mobile computing device) and/or from other devices with which the mobile computing device may interact. For example, the mobile computing device may be powered by and/or integrated with a vehicle (e.g., as a head unit and display inside the vehicle) and/or connected to the vehicle via one or more communication ports (e.g., a smartphone connected to the vehicle via a USB port on the vehicle and/or via a BLUETOOTH® communication protocol), among other possibilities. Additionally, by integrating with the vehicle, the mobile computing device may leverage and/or invoke action from one or more vehicle components (e.g., the mobile computing device may receive data from one or more components of the vehicle via its connection with the vehicle). In an example embodiment, the data collected by the mobile computing device may be used in various ways, including to determine driver behavior while the driver is operating the vehicle (e.g., whether the driver is interacting with the mobile computing device while driving), among other possibilities.

For example, the mobile computing device and/or other components of the navigation system and/or vehicle may detect driver inattention and/or impairment. For example, the mobile computing device and/or other components of the navigation system and/or vehicle may use one or more sensors to detect a driver attribute (e.g., to detect a driver's head is nodding due to sleepiness, intoxication, etc.). In other example, the mobile computing device and/or other components of the navigation system and/or vehicle may use one or more sensors to detect an operational attribute of the vehicle, which may also indicate an attribute of the driver (e.g., one or more sensors monitoring lane crossing or variances during driving, which may indicate driver sleepiness, intoxication, etc.). Other examples are possible.

In a further aspect, the mobile computing device may also send any or all of this data to the modeling computing device to further inform and/or update the accident risk model. For example, the mobile computing device may send one or more geographic locations of the vehicle (i.e., geolocation data) to the modeling computing device while the vehicle is navigating along one or more routes. In response, the modeling computing device may use this updated geographic location data to update one or more of the attributes of the one or more routes identified by the modeling computing device (e.g., the updated risk and/or insurance premiums associated with the one or more routes). In another example, the modeling computing device may use this updated geographic location data to identify one or more suggestion prompts that can be sent to the driver (e.g., via the mobile computing device). For example, the modeling computing device may identify a suggestion prompt for the operator of the vehicle to choose a particular route of the one or more routes and/or a particular time to navigate the one or more routes (or a particular route of the one or more routes), among other possibilities. In a further aspect, the identified suggestion prompts may be based on the updated geographic location data of the mobile computing device and/or the vehicle, as well as one or more attributes of the one or more routes identified by the modeling computing device (e.g., a particular route of the one or more routes presents a lower risk of collision than other routes). Other examples are possible.

For example, the mobile computing device may send data indicating driver behavior to the modeling computing device while the vehicle is navigating along one or more routes. In response, the modeling computing device may use this driver behavior data to identify one or more suggestion prompts that can be sent to the driver (e.g., via the mobile computing device). For example, the modeling computing device may identify a suggestion prompt for the operator of the vehicle to alter his/her/its behavior (e.g., slow down, stop interacting with his/her/it's the mobile computing device while driving), among other possibilities. For example, the modeling computing device may identify a suggestion prompt for the operator of the vehicle to choose a particular route of the one or more routes and/or a particular time to navigate the one or more routes (or a particular route of the one or more routes), among other possibilities. In a further aspect, the identified suggestion prompts may be based on the updated driver behavior data, as well as one or more attributes of the one or more routes identified by the modeling computing device (e.g., the driver/operator of the vehicle has an increased risk of collision if he/she/it interacts with the mobile computing device during a particular section of a route of the one or more routes. Other examples are possible.

In a further aspect, in an example embodiment, once the modeling computing device identifies the attributes and/or updated attributes of the one or more routes, as well as any suggestions prompts concerning driver behavior, the modeling computing device may send those attributes, updated attributes, and/or suggestion prompts to the mobile computing device. Once the mobile computing device receives the attributes, updated attributes, and/or suggestion prompts from the modeling computing device, the mobile computing device may take one or more responsive actions.

In an example embodiment, the mobile computing may display, via a user interface of the mobile computing device, a graphical indication of: (i) the one or more routes; and (ii) the identified attributes of the one or more routes. In one example, the mobile computing device may display a graphical indication of: (i) the one or more routes; and (ii) the risk associated with navigating each of the one or more routes. In another example, the mobile computing may display a graphical indication of: (i) the one or more routes; and (ii) the insurance premiums associated with navigating each of the one or more routes. In a further aspect, the mobile computing device may also update this display at various times while the vehicle is navigating along the one or more routes (e.g., to display the updated risk and/or updated insurance premiums associated with navigating at least one of the one or more routes). Other examples are possible.

For example, in another example embodiment, the mobile computing device may display, via a user interface of the mobile computing device, a graphical indication of the suggestion prompt for the operator of the vehicle to alter his/her/its behavior (e.g., "SLOW DOWN", "If you want to save money on your insurance premiums, stop interacting with your cell phone while driving"). In a further aspect, the mobile computing device may also emit, via one or more speakers of the mobile computing device, an audible indication of the suggestion prompt for the operator of the vehicle to alter his/her/its behavior (e.g., an audible emission for the driver to "SLOW DOWN" and/or "If you want to save money on your insurance premiums, stop interacting with your cell phone while driving"), among other possibilities.

In a further aspect, although the accident risk model has been described above in connection with one or more example display configurations, it should be well understood to one of skill in the art that these are merely examples. Indeed, the information displayed by the navigation system via the mobile computing device may be displayed via one or more software applications and/or websites owned or developed by the insurance company, as well as one or more software applications and/or websites owned or developed by other entities database or website (LIBER®, MAP-QUEST®, etc.).

These systems, methods, and devices may provide technical advantages of vehicle operation by modeling the accident risk of operating the vehicle within one or more geographic regions based on a number of factors. Other features of the systems, methods, and devices are described in further detail in the example embodiments provided below.

II. Example Architecture and Operations

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a sensor 102, a processor 104, a data storage unit 106, a communication interface 108, and/or a user interface 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The sensor 102 can include sensors now known or later developed, including but not limited to accelerometer sensors, a sound detection sensor, a motion sensor, a humidity sensor, a temperature sensor, a proximity sensor (e.g., a Bluetooth sensor and/or communication protocol to determine the proximity of a mobile computing device that is associated with the vehicle owner), a location sensor (e.g., a GPS sensor), time sensors (e.g., a digital clock), collision sensors (e.g., an air bag deployment sensor, impact sensors in the body of the vehicle, etc.), camera sensors (e.g., cameras on a mobile computing device), device interaction sensors (e.g., a touch screen and/or retinal scanner on a mobile computing device, such as a smartphone), and/or a combination of these sensors, among other possibilities.

The processor 104 can include a general-purpose processor (e.g., a microprocessor) and/or a special-purpose processor (e.g., a digital signal processor (DSP)). The processor 104 can execute program instructions included in the data storage unit 106 as discussed below.

The data storage unit 106 can include one or more volatile, non-volatile, removable, and/or non-removable storage components, such as magnetic, optical, and/or flash storage, and/or can be integrated in whole or in part with the processor 104. Further, the data storage unit 106 can take the form of a non-transitory computer-readable storage medium, having stored thereon program instructions (e.g., compiled or non-compiled program logic and/or machine code) that, upon execution by the processor 104, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 108 and/or the user interface 110. The data storage unit 106 can also store other types of data, such as those types described in this disclosure.

The communication interface 108 can allow the computing device 100 to connect with and/or communicate with another entity, such as another computing device, according to one or more protocols. In one example, the communication interface 108 can be a wired interface, such as an Ethernet interface. In another example, the communication interface 108 can be a wireless interface, such as a cellular or WI-FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 110 can include hardware and/or software components that facilitate interaction between the computing device 100 and a user of the computing device 100, if applicable. As such, the user interface 110 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile phone. In a further aspect, the features described herein may involve some or all of these components arranged in different ways, including additional or fewer components and/or different types of components, among other possibilities.

B. Navigation System Configured for Use with a Vehicle

Figure 2A:
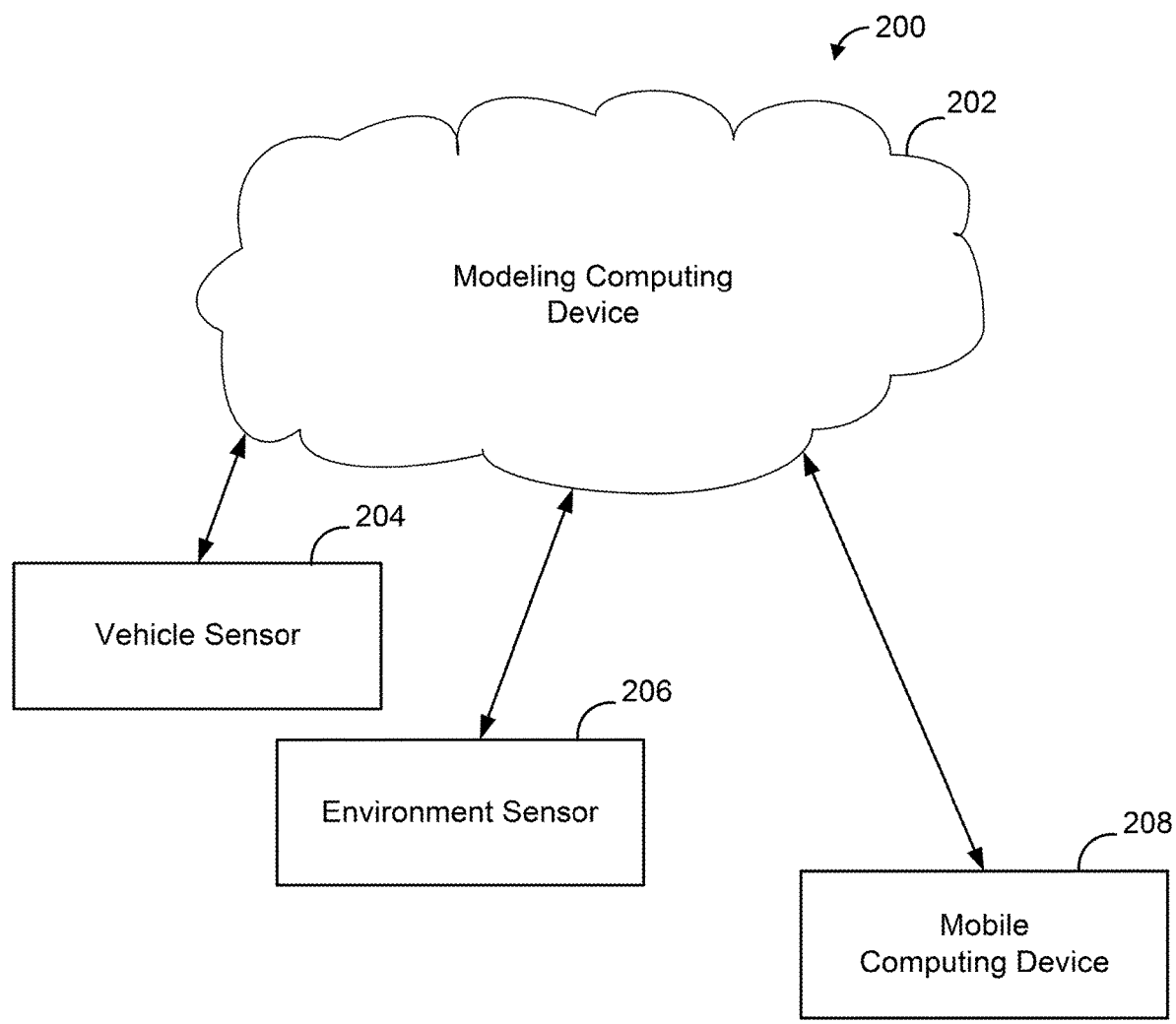
FIG. 2A is a navigation system configured for use with a vehicle in a first state.

FIG. 2A is an example navigation system 200 configured for use with a vehicle in a first state. The navigation system 200 can perform various acts and/or functions related to collecting vehicle sensor data, environmental sensor data, and/or data from one or more mobile computing devices to generate an accident risk model for one or more geographic regions and take one or more responsive actions to address these risk conditions, and can be implemented as a computing system. In this disclosure, the term "computing system" means a system that includes at least one computing device, such as computing device 100. In some instances, a computing system can include one or more other computing systems.

It should also be readily understood that computing device 100, navigation system 200, and any of the components thereof, can be physical systems made up of physical devices, cloud-based systems made up of cloud-based devices that store program logic and/or data of cloud-based applications and/or services (e.g., for performing at least one function of a software application or an application platform for computing systems and devices detailed herein), or some combination of the two.

In any event, the navigation system 200 can include various components, such as a modeling computing device 202 (shown here as a cloud-based computing device), a vehicle sensor 204, an environment sensor 206, and a mobile computing device 208, each of which can be implemented as a computing system or part of a computing system.

The navigation system 200 can also include connection mechanisms (shown here as lines with arrows at each end (i.e., "double arrows"), which connect modeling computing device 202, a vehicle sensor 204, an environment sensor 206, and a mobile computing device 208, and may do so in a number of ways (e.g., a wired mechanism, wireless mechanisms and communication protocols, etc.).

In practice, the navigation system 200 is likely to include many of some or all of the example components described above, such as the such as modeling computing device 202, a vehicle sensor 204, an environment sensor 206, and a mobile computing device 208, which can allow many policyholders and/or potential customers to communicate and interact with the insurance company, insurance company to communicate and interact with the policyholder and/or potential customer, and so on.

Other computational actions, displayed messages, audible alerts, visual alerts, and configurations are possible.

The navigation system 200 and/or components thereof can perform various acts and/or functions (many of which are described above). Examples of these and related features will now be described in further detail.

Within navigation system 200, modeling computing device 202 may collect data from a number of sources within a geographic region.

In one example, modeling computing device 202 may collect data from one or more vehicle sensors 204 on one or more vehicles operating within the geographic region. This vehicle sensor data may include data from one or more of the following sensors on one or more vehicles operating within the geographic region: (i) GPS sensors; (ii) accelerometer sensors; (iii) weather sensors; (iv) collision sensors; and (v) camera sensors, among other possibilities.

In another example, modeling computing device 202 may collect data from one or more environment sensors 206 collecting data in and/or otherwise indicating information about the geographic region. This environment sensor data may include data from one or more of the following, and or all of which may be located on devices within and/or outside of the geographic region: (i) weather data; (ii) traffic data; (iii) accident data; (iv) time data; (v) map data; (vi) road condition data; and (vii) camera data, among other possibilities In yet another example, modeling computing device 202 may collect data from one or more mobile computing devices (e.g., used in connection with one or more vehicles) within the geographic region. In a further aspect, these one or more may include a mobile computing device associated with the driver (e.g., the driver's cellular device/smartphone), a mobile computing device associated with the vehicle (e.g., a computing system and/or head unit installed in the vehicle), or both, among other possibilities. The data collected from these mobile computing devices may include operational data of a vehicle (e.g., speed and direction of travel for the vehicle), as well as data indicating driver behavior inside the vehicle (e.g., driver intoxication, sleepiness, etc.), among other possibilities, from one or more of the following sensors of the mobile computing device and/or vehicle operating within the geographic region: (i) GPS sensors; (ii) accelerometer sensors; (iii) device interaction sensor; (iv) time sensor; (v) weather sensors; (vi) collision sensors; and (vii) camera sensors, among other possibilities Once the modeling computing device 202 collects data from the vehicle sensor 204, environment sensor 206, mobile computing device 208, and/or other sources, the modeling computing device 202 may generate an accident risk model using one or more machine learning models (e.g., a naïve Bayes classifier machine learning model). In example embodiments, this accident risk model may be constructed using any or all of the data collected from the vehicle sensor 204, environment sensor 206, mobile computing device 208, and/or other sources. In a further aspect, the accident risk model may indicate, for each of multiple areas within the geographic region, a respective accident risk of operating the vehicle within a respective area. These respective areas can include, for example, roads within the geographic region. Furthermore, the accident risk model may be updated over time based on further data collected from the vehicle sensor 204, environment sensor 206, mobile computing device 208, and/or other sources.

After the accident risk model is generated and/or regenerated by the modeling computing device 202, the modeling computing device may receive a request for navigating between a first geographic position and a second geographic position. In a further aspect, this request may come from the mobile computing device 208 and/or other sources.

In one example, once the request is received by the modeling computing device 202, the modeling computing device may identify attributes of one or more routes between the first geographic position and the second geographic position and through the geographic region. These attributes of the one or more routes may be based on the accident risk model, among other possibilities. Further, because the accident risk model may be updated over time based on further data collected from the vehicle sensor 204, environment sensor 206, mobile computing device 208, and/or other sources, the attributes identified by the modeling computing device 202 may be updated as well. These attributes include, for example, the risk and/or insurance premiums associated with navigating the one or more routes described above, among other possibilities. Modeling computing device 202 can also send these attributes and updated attributes to the mobile computing device 208.

In another example, the mobile computing device 208 may send data to the modeling computing device 202 and, in response, the modeling computing device may identify suggestion prompts for the mobile computing device, including suggestion prompts relating to improving driver behavior and/or driver decisions (e.g., choosing a particular route of the one or more routes), among other possibilities. Further, because the accident risk model may be updated over time based on further data collected from the vehicle sensor 204, environment sensor 206, mobile computing device 208, and/or other sources, the suggestion prompts identified by the modeling computing device 202 may be updated as well. Modeling computing device 202 can also send these suggestion prompts and updated suggestion prompts to the mobile computing device 208.

Once the mobile computing device 208 receives the attributes and/or suggestion prompts identified by the modeling computing device 202, the mobile computing device may display (e.g., via a user interface of the mobile computing device), one or more graphical indications of the following: (i) the one or more routes; (ii) the identified attributes of the one or more routes; (iii) the risk associated with navigating each of the one or more routes; (iv) the insurance premiums associated with navigating each of the one or more routes; (v) one or more suggestion prompts for the operator of the vehicle to make a particular decision (e.g., choose a particular route of the one or more routes); and (vi) one or more suggestion prompts for the operator of the vehicle to alter his/her/its behavior, among other possibilities. In a further aspect, the mobile computing device may also update this display at various times while the vehicle is navigating along the one or more routes (or other times) for a variety of reasons (e.g., in response to the modeling computing device 202 updating the accident risk model over time based on further data collected from the vehicle sensor 204, environment sensor 206, mobile computing device 208, and/or other sources). Other examples are possible.

Other computational actions, displayed graphical indications, alerts, and configurations are possible.

Figure 2B:
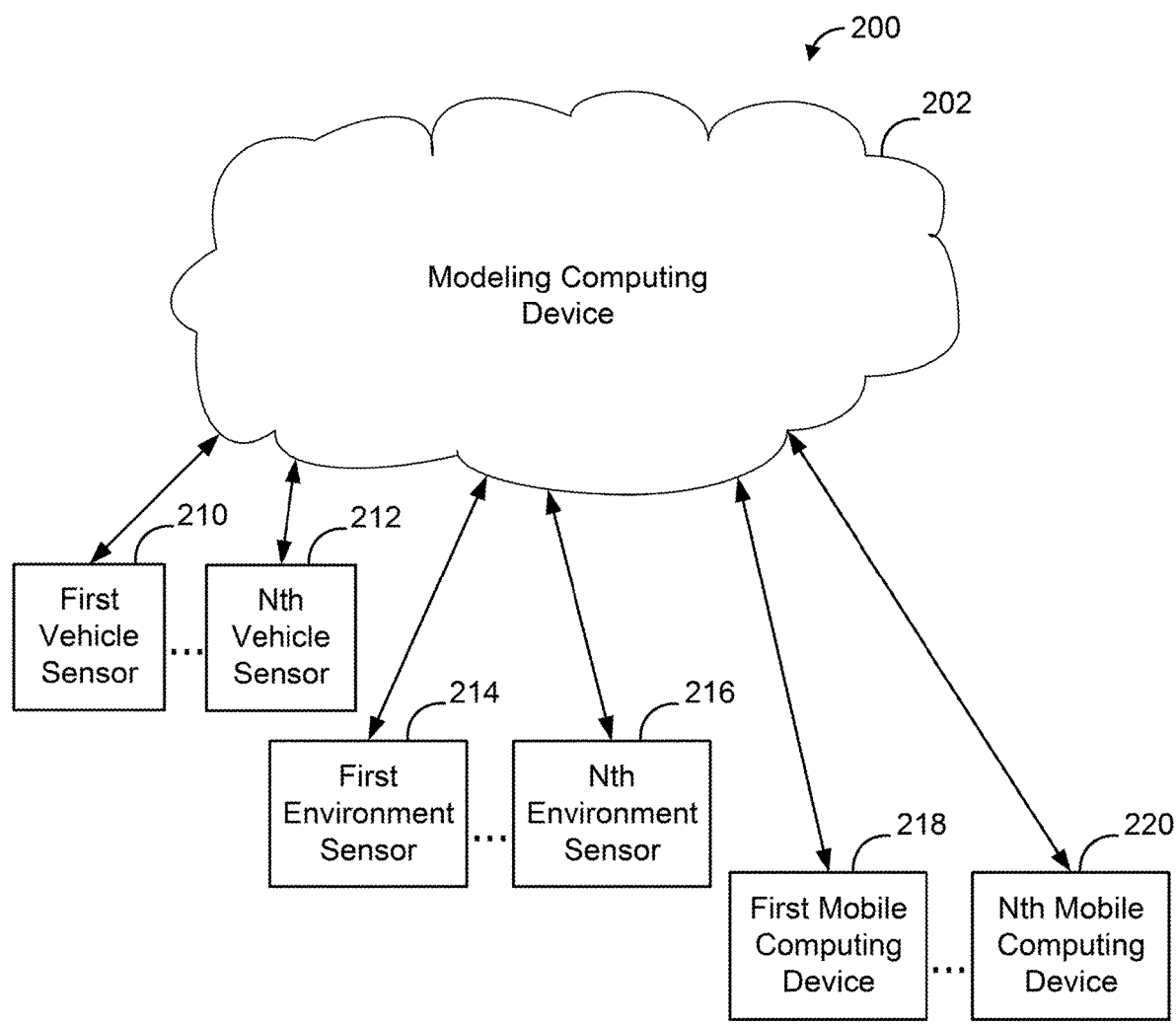
FIG. 2B is a navigation system configured for use with a vehicle in a second state.

For example, FIG. 2B is the example navigation system 200 in FIG. 2A configured for use with a vehicle in a second state.

Similar to FIG. 2A, the navigation system illustrated in FIG. 2B can include various components, such as a modeling computing device 202 (shown here as a cloud-based computing device), one or more vehicle sensors (shown here as a first vehicle sensor 210 up to an Nth vehicle sensor 212), one or more environment sensors (shown here as a first environment sensor 214 up to an Nth environment sensor 216), and one or more mobile computing devices (shown here as a first mobile computing device 218 up to an Nth mobile computing device 220), each of which can be implemented as a computing system or part of a computing system.

In practice, the navigation system 200 illustrated in FIG. 2B is likely to include many of some or all of the example components described above in FIGS. 2A and 2B, which can allow a network of many policyholders and/or potential customers to communicate and interact with and contribute to the analysis performed by the modeling computing device 202, as well as the insurance company, the insurance company to communicate and interact with the policyholder and/or potential customer, and so on.

For example, within navigation system 200, modeling computing device 202 may collect data from a number of sources within a geographic region.

In one example, modeling computing device 202 may collect data from one or more vehicle sensors, potentially on one or more different vehicles operating within the geographic region (shown here as a first vehicle sensor 210 up to an Nth vehicle sensor 212). This vehicle sensor data may include data from one or more of the following sensors on one or more vehicles operating within the geographic region: (i) GPS sensors; (ii) accelerometer sensors; (iii) weather sensors; (iv) collision sensors; and (v) camera sensors, among other possibilities.

In another example, modeling computing device 202 may collect data from one or more environment sensors collecting data in and/or otherwise indicating information about the geographic region (shown here as a first environment sensor 214 up to an Nth environment sensor 216). This environment sensor data may include data from one or more of the following, and or all of which may be located on separate devices within and/or outside of the geographic region: (i) weather data; (ii) traffic data; (iii) accident data; (iv) time data; (v) map data; (vi) road condition data; and (vii) camera data, among other possibilities In yet another example, modeling computing device 202 may collect data from one or more mobile computing devices (e.g., used in connection with one or more separate vehicles) within the geographic region (shown here as a first mobile computing device 218 up to an Nth mobile computing device 220). In a further aspect, these one or more may include a mobile computing device associated with the driver (e.g., the driver's cellular device/smartphone), a mobile computing device associated with the vehicle (e.g., a computing system and/or head unit installed in the vehicle), or both, among other possibilities. The data collected from these mobile computing devices may include operational data of a vehicle (e.g., speed and direction of travel for the vehicle), as well as data indicating driver behavior inside the vehicle (e.g., driver intoxication, sleepiness, etc.), among other possibilities, from one or more of the following sensors of the mobile computing device and/or vehicle operating within the geographic region: (i) GPS sensors; (ii) accelerometer sensors; (iii) device interaction sensor; (iv) time sensor; (v) weather sensors; (vi) collision sensors; and (vii) camera sensors, among other possibilities.

In a further aspect, by collecting data from the network of one or more vehicle sensors, one or more environment sensors, and one or more mobile computing devices illustrated in FIG. 2B, the modeling computing device 202 may generate a comprehensive accident risk model using one or more machine learning models (e.g., a naïve Bayes classifier machine learning model). In example embodiments, this accident risk model may be constructed using any or all of the data collected from the network of one or more vehicle sensors, one or more environment sensors, and one or more mobile computing devices, and/or other sources, any or all of which may be located at different locations within the geographic region or otherwise. In this way, the accident risk model include sensor and/or mobile computing device data for a number of vehicles operating in each of multiple areas within the geographic region. These respective areas can include, for example, different roads within the geographic region. Furthermore, the accident risk model may be updated over time based on further data collected from these sources.

For example, after the accident risk model is generated and/or regenerated by the modeling computing device 202, the modeling computing device may receive a request for navigating between a first geographic position and a second geographic position from a first mobile computing device 218. In response to this request, modeling computing device 202 may identity one or more routes between the first geographic position and the second geographic position and through the geographic region. And, these attributes of the one or more routes may be based on the accident risk model generated based on based on any number of vehicle sensors operating within the geographic region (shown here as a first vehicle sensor 210 up to an Nth vehicle sensor 212) and any number of environment sensors (shown here as a first environment sensor 214 up to an Nth environment sensor 216), among other possibilities.

For example, for driver's that have opted to use navigation system 200, one or more mobile computing devices (shown here as a first mobile computing device 218 up to an Nth mobile computing device 220) may be used to update the accident risk model and/or one or more attributes of the one or more routes within the geographic region. For example, one or more mobile computing devices in the region may indicate that one or more drivers are interacting with their respective mobile computing devices in a manner that increases accident risk (e.g., several drivers within the geographic region are texting while driving).

Furthermore, in some examples, these indications of increased accident risk may indicate increased risk in a particular area of the geographic region (e.g., several drivers on a particular route within the geographic region are texting while driving). In this way, because the accident risk model may be updated over time based on data collected from a network of sensors and/or mobile computing devices, and/or other sources, the attributes identified by the modeling computing device 202 may be updated and utilized for targeted analysis as well. For example, considering the accident risk model and/or one or more attributes of the one or more routes within the geographic region, driver behavior associated with one or more mobile computing devices on a particular route of the one or more routes might indicate increased risk and/or insurance premiums associated with navigating the particular route of the one or more routes described above, among other possibilities.

In another example, the modeling computing device may identify suggestion prompts for the mobile computing device based on this network of sensor and/or mobile computing device data, including suggestion prompts relating to improving driver behavior and/or driver decisions in the vehicle and/or other vehicles (e.g., choosing a particular route of the one or more routes), among other possibilities. Furthermore, one or more of the mobile computing devices may display (e.g., via a user interface of the mobile computing device), one or more graphical indications of the following: (i) the one or more routes; (ii) the identified attributes of the one or more routes; (iii) the risk associated with navigating each of the one or more routes; (iv) the insurance premiums associated with navigating each of the one or more routes; (v) one or more suggestion prompts for the operator of the vehicle and/or other vehicles to make a particular decision (e.g., choose a particular route of the one or more routes); and (vi) one or more suggestion prompts for the operator of the vehicle and/or other vehicles to alter his/her/its behavior, among other possibilities. In a further aspect, the mobile computing devices may also update this display at various times while the vehicle and/or other vehicles are navigating along the one or more routes (or other times) for a variety of reasons. Other examples are possible.

C. Example Mobile Device of the Navigation System and Graphical User Interfaces

To further illustrate the above-described concepts and others, FIGS. 3A-3D depict a graphical user interface, in accordance with example embodiments. Although illustrated in FIGS. 3A-3D as being displayed via a user interface of a mobile computing device, this graphical user interface may be provided for display by one or more components described in connection with navigation system 200 (e.g., via a user interface of mobile computing device 208), among other possibilities.

The information displayed by the graphical user interfaces may also be derived, at least in part, from data stored and processed by the components described in connection with the navigation system 200, and/or other computing devices or systems configured to generate such graphical user interfaces and/or receive input from one or more users (e.g., those described in connection with navigation system 200, as well as the components of FIGS. 1 and 2). This graphical user interface is merely for the purpose of illustration. The features described herein may involve graphical user interfaces that format information differently, include more or less information, include different types of information, and relate to one another in different ways.

Turning to FIGS. 3A-3D, FIGS. 3A-3D, depict an example graphical user interface 300 in various states. Graphical user interface 300 includes visual representations that notify the user of a computing device associated with the vehicle, the navigation system, or both that one or more potential routes between a first geographic position and a second geographic position have been detected and presents the user with visual indications of risk associated with the one or more routes and/or various actions that may be taken in response to the detected information.

Figure 3A:
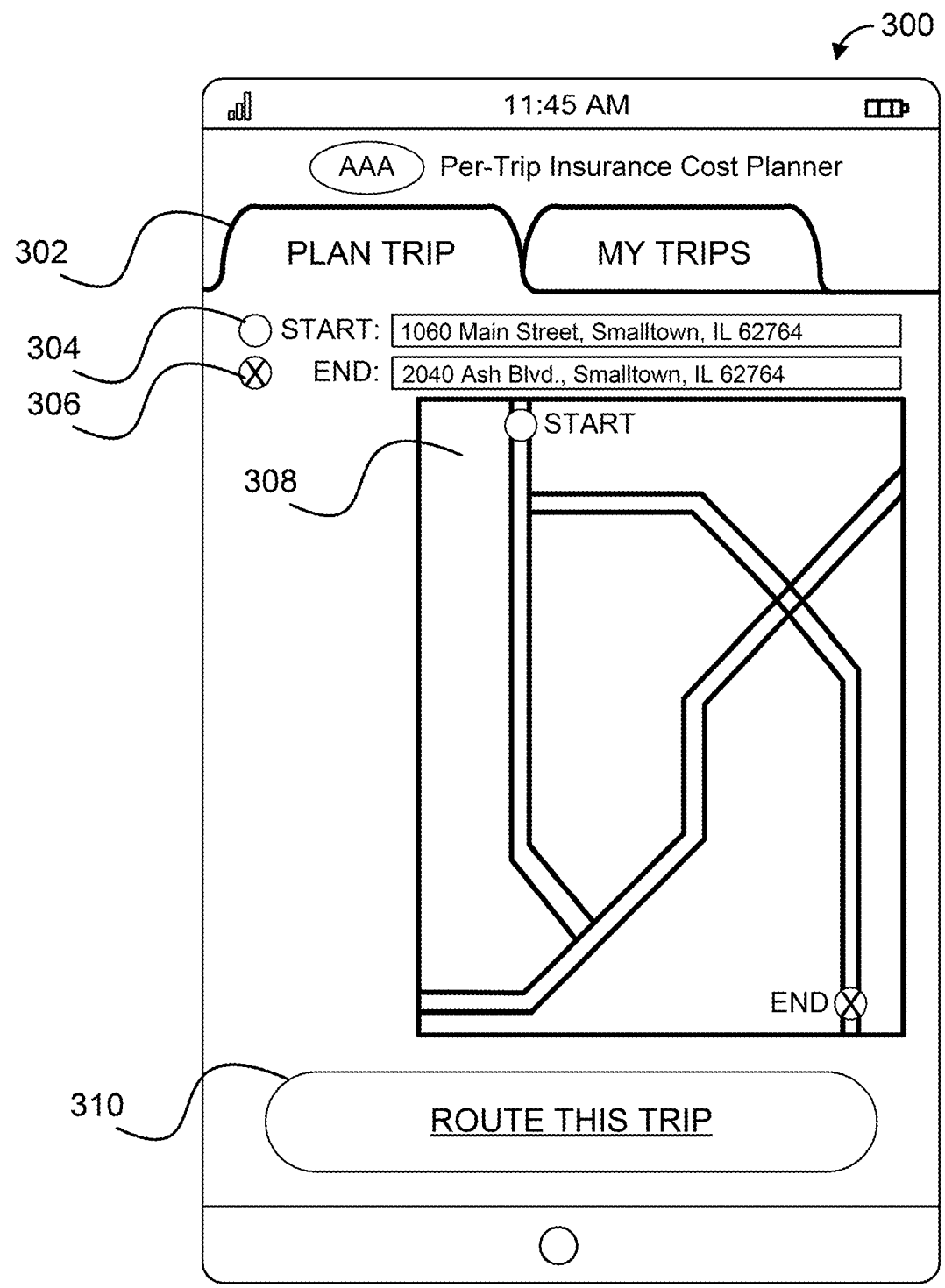
FIG. 3A is an example mobile device of a navigation system and graphical user interface in a first state.

Specifically, in the context of FIG. 3A, FIG. 3A depicts an example graphical user interface 300 illustrated in a first state. In FIG. 3A, graphical user interface 300 displays a trip planning tab 302, which prompts the user of the mobile computing device to enter a starting address 304 and an ending address 306 for a trip. After a user enters these values, the graphical user interface 300 displays a graphical trip indicator 308 of one or more potential routes between the starting address 304 (i.e., a first geographic position) and the ending address 306 (i.e., a second geographic position) for a trip. Once the user reviews the information displayed in trip planning tab 302, the user may indicate the mobile computing device should route this trip via trip confirmation prompt 310 (shown here as "ROUTE THIS TRIP").

Figure 3B:
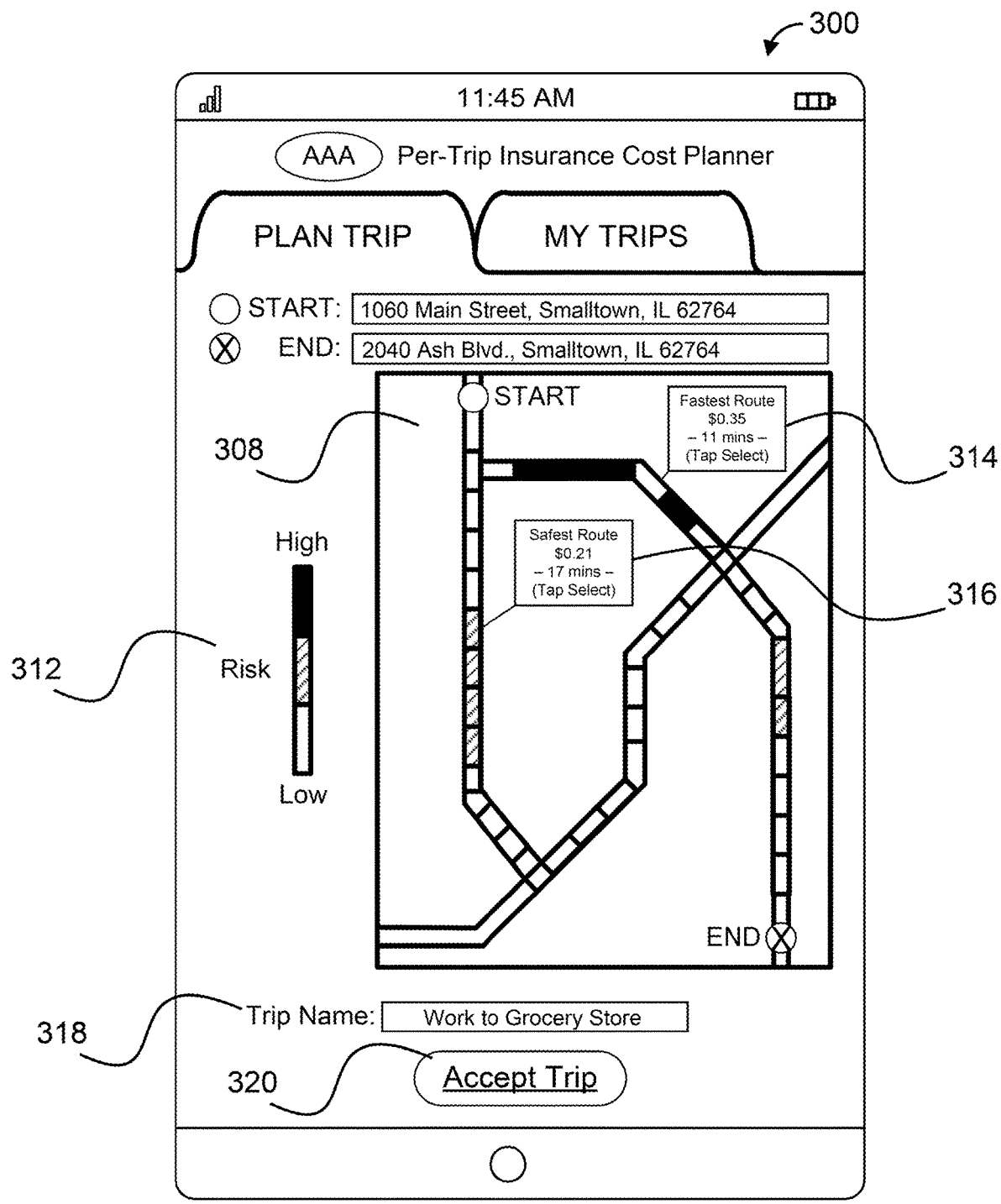
FIG. 3B is the example mobile device of the navigation system and graphical user interface of FIG. 3A, but in a second state.

Turning to FIG. 3B, FIG. 3B depicts the example graphical user interface 300 illustrated in a second state. In FIG. 3B, the user has selected to route a trip (e.g., via trip confirmation prompt 310) and graphical user interface 300 displays additional information pertaining to the one or more potential routes via a graphical trip indicator 308. In FIG. 3B, a risk guide 312 is displayed that corresponds to the levels of accident risk presented along various portions of the one or more potential routes between the starting address 304 and the ending address 306 for a trip. As shown in FIG. 3B, risk guide 312 displays high accident risk areas as a solid black pattern (shown here as "HIGH"), high accident risk areas as a solid white pattern (shown here as "LOW"), and medium accident risk areas as a hashing pattern (shown here between the "HIGH" and "LOW" risk portions of risk guide 312).

Turning to graphical trip indicator 308, these same risk indicators are provided along various portions of the one or more routes between starting address 304 and the ending address 306. As described in further detail above, these risk indicators may be based on one or more accident risk models for these areas within an area, for example, using the collected sensor data and environmental data of vehicles and/or sensors operating within the area.

As shown in FIG. 3B, two potential routes are identified between starting address 304 and the ending address 306, a faster route indicated by a first route indicator 314 and a safer route indicated by a second route indicator 316. For each of these routes, the mobile computing device and/or a modeling computing device associated with the mobile computing device may determine additional information associated with navigating each of these routes and display that information via graphical user interface 300 as well. For example, as shown in FIG. 3B, first route indicator 314 may also display one or more indications of characteristics associated with navigating the first route, including that the first route is the faster route to navigate of the two potential routes (shown here as "FASTEST ROUTE"), an insurance premium associated with navigating the first route (shown here as "$0.35"), an estimated time for navigating the first route (shown here as "11 MINS"), and a prompt for the user to select that route for navigation, if the user so chooses (shown here as "TAP SELECT"). On the other hand, as also shown in FIG. 3B, second route indicator 316 may also display one or more indications of characteristics associated with navigating the second route, including that the second route is a safer route to navigate than the first route (shown here as "SAFEEST ROUTE"), which may result in a lower insurance premium associated with navigating the second route (shown here as "$0.21"), but a longer estimated time for navigating the second route (shown here as "17 MINS"), and a prompt for the user to select the second route for navigation (shown here as "TAP SELECT"). Other examples and/or additional information and prompts for display via graphical user interface 300 are possible.

For example, as shown in FIG. 3B, after a user enters these values, the graphical user interface 300 may display a prompt 318 for the user to save the trip between the starting address 304 and the ending address 306 for a future trip, and may even name the trip by a certain name (shown here as "WORK TO GROCERY STORE"). Other examples are possible. In any event, once the user selects the route the user would like to use to navigate from the starting address 304 to the ending address 306 (e.g., using first route indicator 314 or second route indicator 316), the user may accept the navigation instructions for the selected route via prompt 320.

Figure 3C:
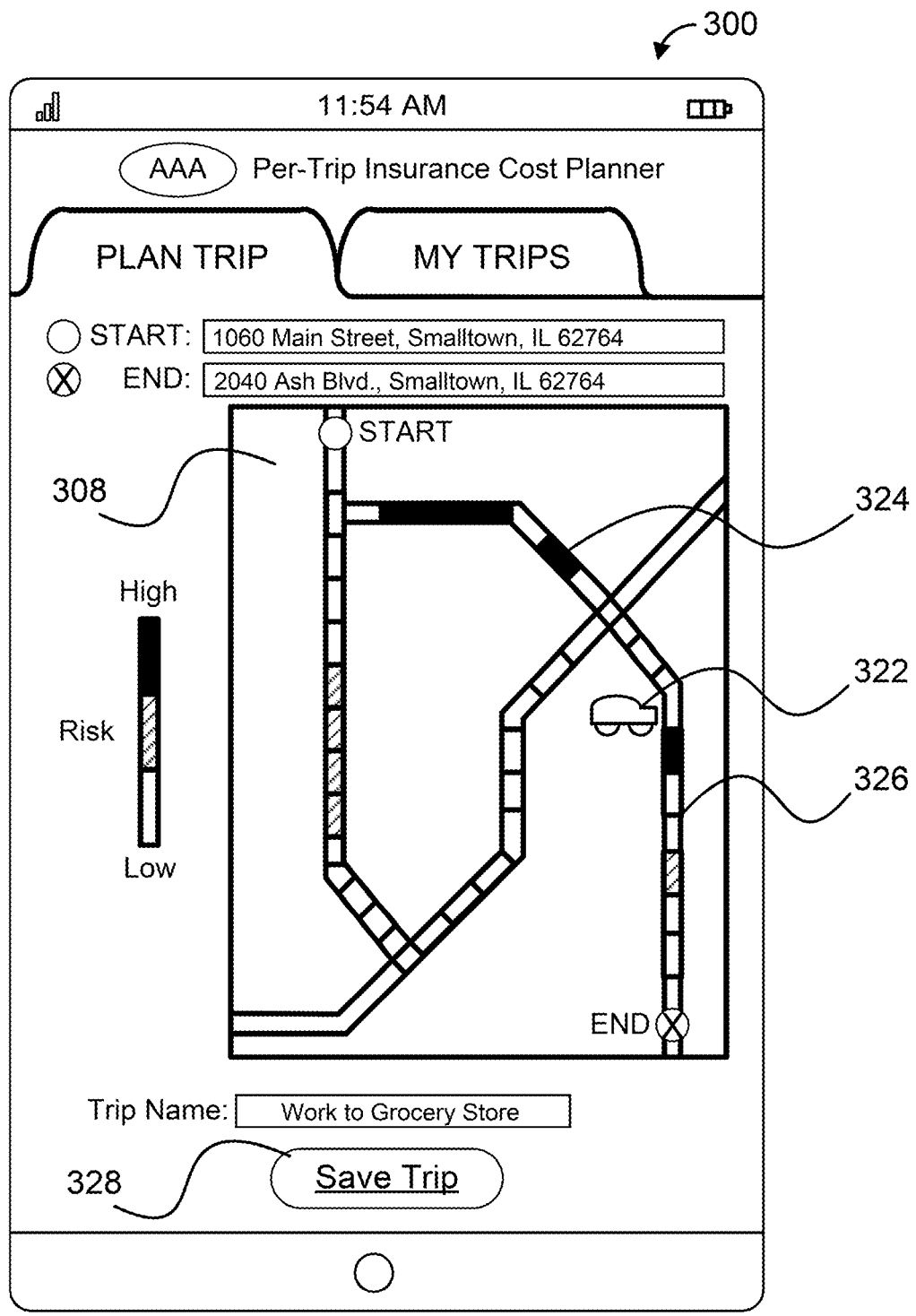
FIG. 3C is the example mobile device of the navigation system and graphical user interface of FIGS. 3A-3B, but in a third state.

Turning to FIG. 3C, FIG. 3C depicts the example graphical user interface 300 illustrated in FIGS. 3A and 3B, in a third state. In FIG. 3C, the user has accepted a specific route for a trip (e.g., via first route indicator 314 and/or route confirmation prompt 320) and graphical user interface 300 displays additional information pertaining to the selected route via graphical trip indicator 308. In FIG. 3C, a vehicle indicator 322 is displayed that corresponds to the position of the vehicle along the selected route and the levels of accident risk presented along various portions of the remainder of the route between the starting address 304 and the ending address 306 for a trip. As shown in FIG. 3C, graphical user interface 300 displays different accident risk areas as different patterns in the various areas of the remaining portions of the route (shown here as remaining trip route indicator 326, displaying a solid black pattern in the area immediately in ahead of the vehicle indicator 322, followed by a solid white pattern and other risk patterns along the way to the end point, all of which may update in real time over the course of the trip). In FIG. 3C, graphical user interface 300 also displays the accident risk indicator for the areas already traveled along the route (shown here as travelled trip route indicator 324), and may display one or more graphical indications and/or overlays over the portions of the route already traveled (e.g. displaying a semi-opaque pattern and/or fill over or around the displayed route that indicates one or more portions of the route have been travelled, while still allowing the underlying risk indicator pattern in the areas already travelled appear on graphical user interface 300).

As described in further detail above, the graphical indications in FIG. 3C (including the vehicle indicator 322 and/or the risk indicators along the selected route) may vary in real time based, for example, on updated sensor data (e.g., using updated sensor data and environmental data of vehicles and/or sensors operating within the area) and/or recursively regenerated accident risk models for the areas along the route, among other possibilities. Other examples and/or additional information and prompts for display via graphical user interface 300 are possible.

For example, as shown in FIG. 3C, after a user enters these values, the graphical user interface 300 may display a prompt 328 for the user to save the trip between the starting address 304 and the ending address 306 for a future trip. Other examples are possible. In any event, once the vehicle has finished navigating the selected route, the user may be presented with one or more summaries of the navigated trip and/or previously navigated trips, among other possibilities.

Figure 3D:
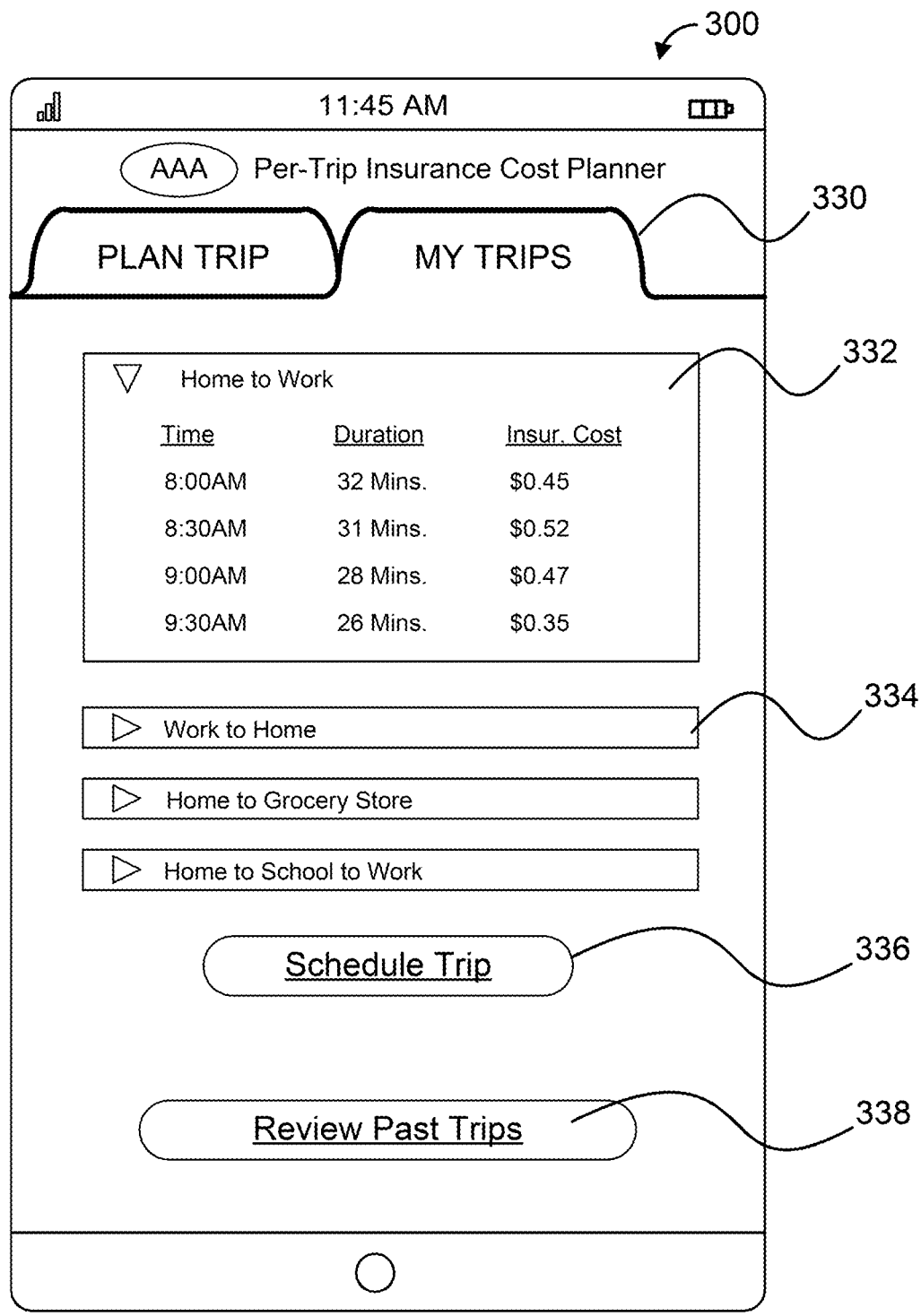
FIG. 3D is the example mobile device of the navigation system and graphical user interface of FIGS. 3A-3C, but in a fourth state.

For example, in the context of FIG. 3D, FIG. 3D depicts an example graphical user interface 300 illustrated in a fourth state. In FIG. 3D, graphical user interface 300 displays a trip summary tab 330, which provides the user of the mobile computing device with various options to review details of one or more previous trips and/or plan one or more trips at different times and information associated with each trip at each time. For example, in FIG. 3D, graphical user interface 300 displays a first trip summary 332 that provides information pertaining to future duration and costs associated with a particular trip travelled in the past, all of which depends on which time the user chooses to navigate that the first trip. As shown in FIG. 3D, first trip summary 332 may display one or more indications of characteristics associated with navigating the first trip at a first time (shown here as a departure time of "8:00 AM"). First trip summary 332 may also display an estimated time for navigating the first trip at the first time (shown here as "32 MINS") and/or a particular insurance premium associated with navigating the first trip at the first time (shown here as "$0.45"). On the other hand, as also shown in FIG. 3D, a first trip summary 332 may also display one or more indications of characteristics associated with navigating the first trip at a second time (shown here as departing at "8:30 AM"), as well as indicating that navigating the first trip at the second time is faster (shown here as "31 MINS"), but more prone to accident risk, which may result in a higher insurance premium associated with navigating the first trip at the second time (shown here as "$0.52"). As further illustrated in FIG. 3D, additional departure times for navigating the first trip (and the associated trip durations and insurance premiums for each departure time) may be presented to the user via graphical user interface 300. Other examples and/or additional information and prompts for display via graphical user interface 300 are possible.

For example, as also shown in FIG. 3D, graphical user interface 300 may display a second trip summary 334 that contains similar information to first trip summary 332 and provides information pertaining to another trip, shown here as an opposite trip for first trip summary 332 ("WORK TO HOME" vs. "HOME TO WORK"). Furthermore, although second trip summary 334 is illustrated as a collapsed menu item in FIG. 3D, any one of the trip summaries illustrated in FIG. 3D may be collapsible menu items and expanded (as shown in first trip summary 332) and/or collapsed—for example, using the triangle icon at the end each trip summary icon. In a further aspect, the information displayed for each trip summary may be updated in real time (e.g., based on updated sensor data and/or environmental data of vehicles and/or sensors operating within the area) and/or recursively regenerated accident risk models for the areas along the trip, among other possibilities. Additionally or alternatively, the trip summaries may allow the user to agree to a particular departure time and/or insurance premium immediately prior to navigating the trip and/or in advance of navigating the trip (e.g., the night before the trip) and agree to the terms displayed using trip scheduling prompt 336 and/or various other icons displayed on graphical user interface 300 (e.g., a particular departure time and associated insurance premium displayed in a particular row in first trip summary 332). Other examples and/or additional information and prompts for display via graphical user interface 300 are possible.

For example, as also shown in FIG. 3D, graphical user interface 300 may display a past trips summary 338 (shown here as "Review Past Trips") that contains similar information to first trip summary 332 and/or second trip summary 334 and provides information pertaining to one or more past trips, including duration and insurance costs associated with previous trips, all of which may be displayed in manner similar to the information displayed in the example embodiment of FIG. 3D. Other examples and/or additional information and prompts for display via graphical user interface 300 are possible.

Figure 4A:
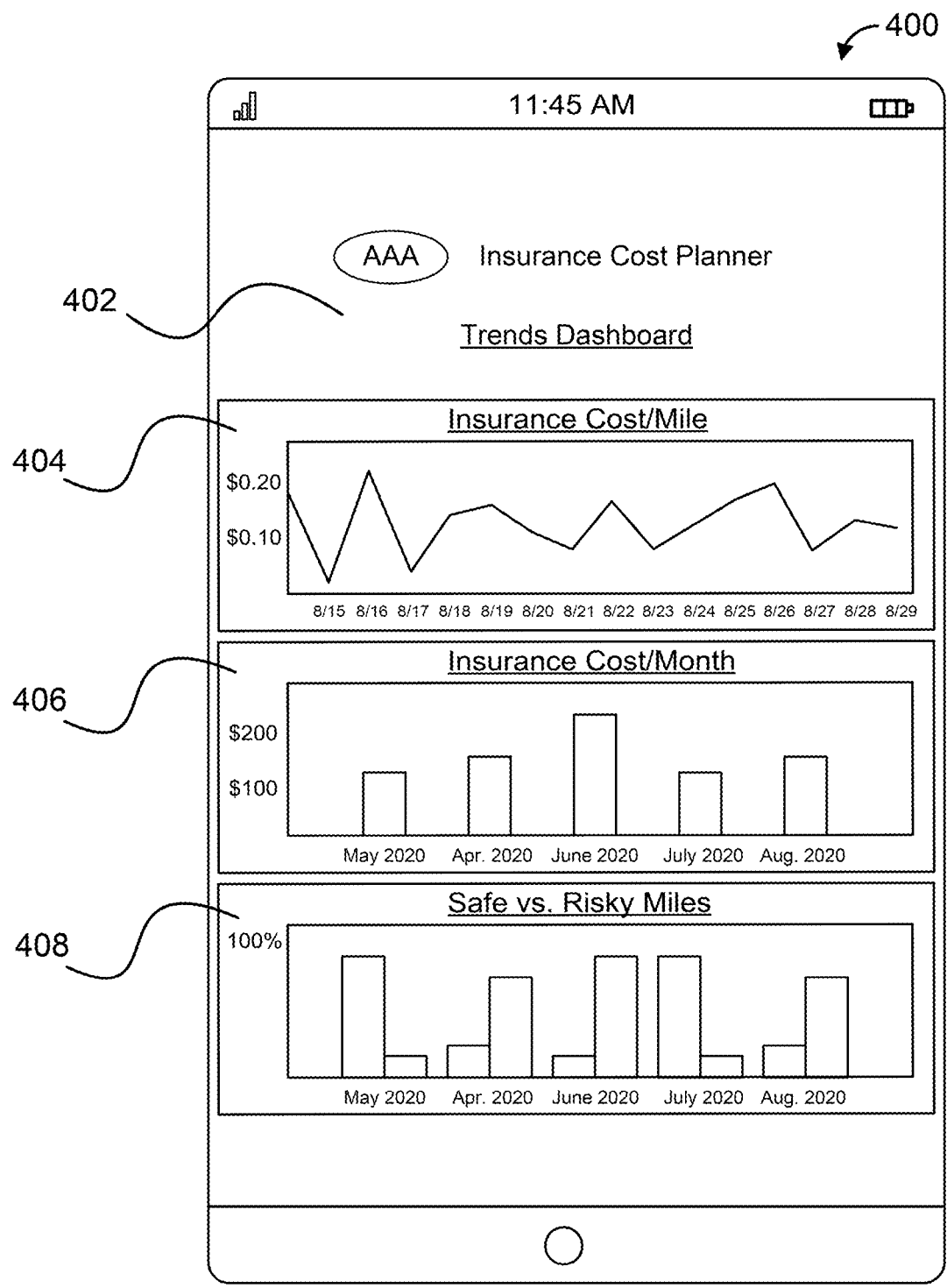
FIG. 4A is an example mobile device of a navigation system and graphical user interface in a first state.
Figure 4B:
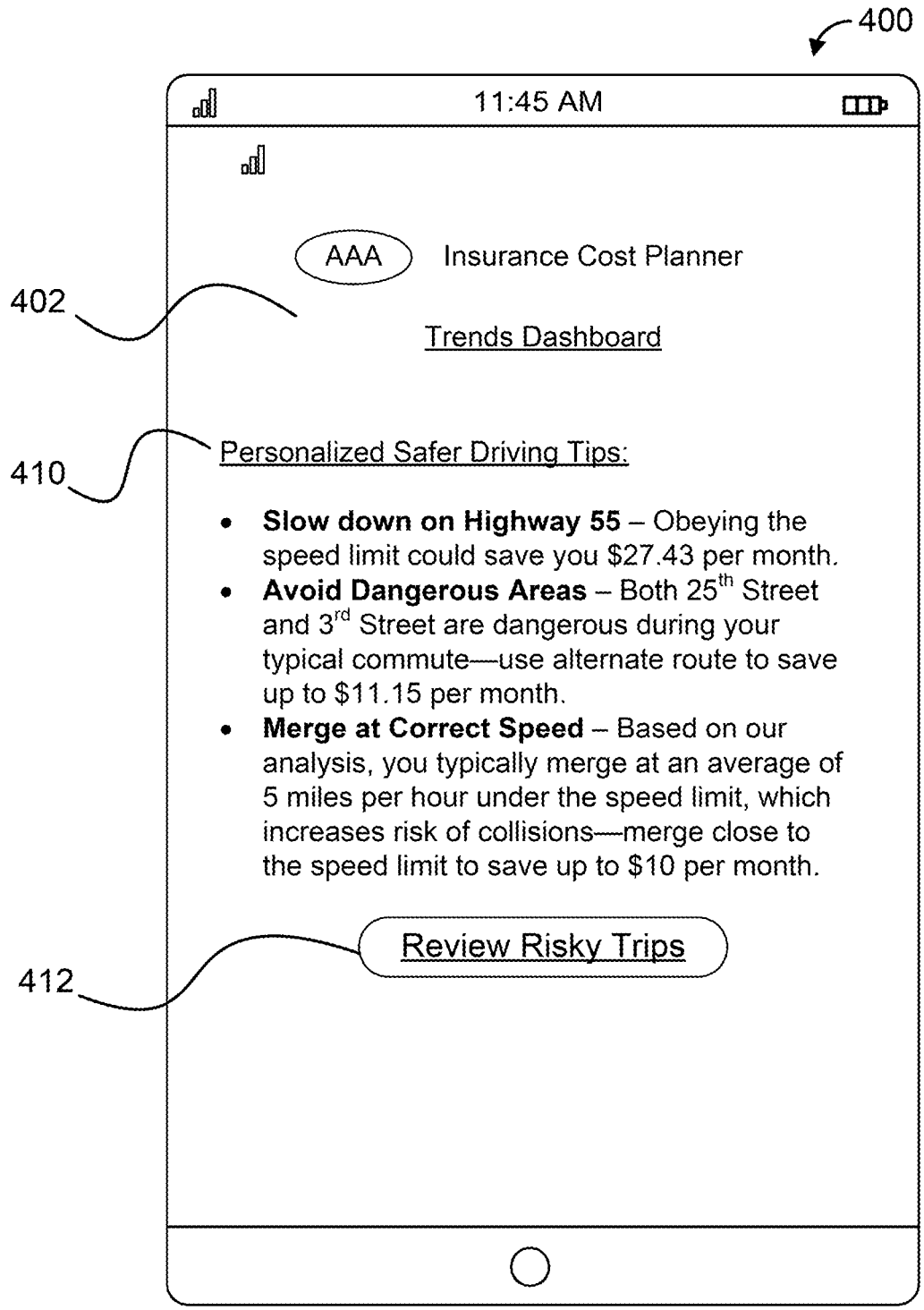
FIG. 4B is the example mobile device of the navigation system and graphical user interface of FIG. 4A, but in a second state.
Figure 4C:
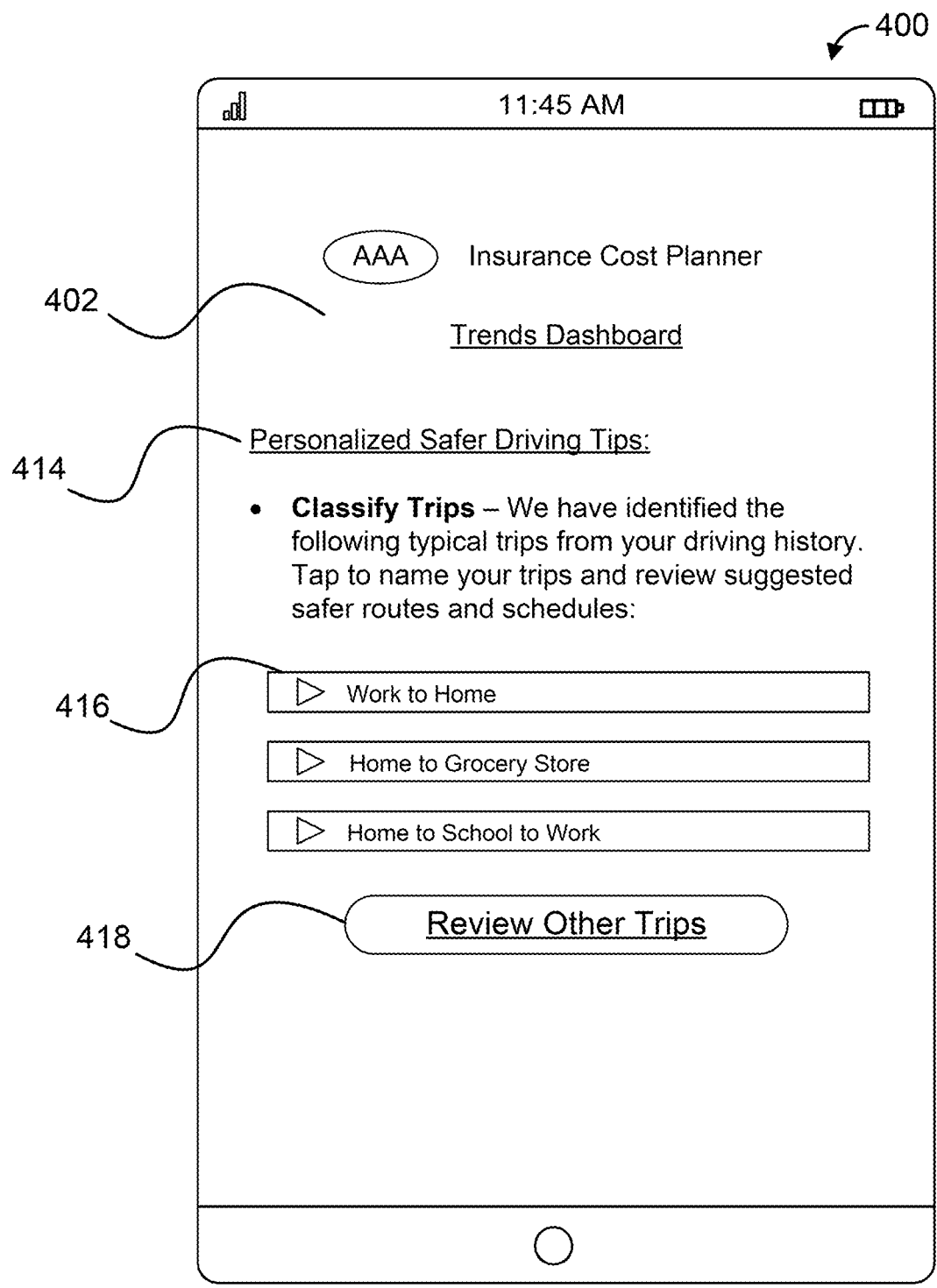
FIG. 4C is the example mobile device of the navigation system and graphical user interface of FIGS. 4A-4B, but in a third state.

To further illustrate the above-described concepts and others, FIGS. 4A-4C depict a graphical user interface, in accordance with example embodiments. Although illustrated in FIGS. 4A-4C as being displayed via a user interface of a mobile computing device, this graphical user interface may be provided for display by one or more components described in connection with navigation system 200 (e.g., via a user interface of mobile computing device 208) and/or graphical user interface 300, among other possibilities.

The information displayed by the graphical user interfaces may also be derived, at least in part, from data stored and processed by the components described in connection with the navigation system 200, graphical user interface 300, and/or other computing devices or systems configured to generate such graphical user interfaces and/or receive input from one or more users (e.g., those described in connection with navigation system 200, as well as the components of FIGS. 1, 2, and/or 3A-3D). This graphical user interface is merely for the purpose of illustration. The features described herein may involve graphical user interfaces that format information differently, include more or less information, include different types of information, and relate to one another in different ways.

Turning to FIGS. 4A-4C, FIGS. 4A-4C, depict an example graphical user interface 400 in various states. Graphical user interface 400 includes visual representations that notify the user of a computing device associated with the vehicle, the navigation system, or both of information that may allow the driver to make one or more adjustments to the driver's behavior and/or presents the user with visual indications of risk associated with the one or more routes and/or various actions that may be taken in response to the detected information.

Specifically, in the context of FIG. 4A, FIG. 4A depicts an example graphical user interface 400 illustrated in a first state. In FIG. 4A, graphical user interface 400 displays a driving trends dashboard 402, which provides the user of the mobile computing device with one or more summaries of driving habits over one or more periods of time (e.g., using the driving data described above in the context of FIGS. 2 and 3A-3D). Graphical user interface 400 may also assists the user in better understanding (and adjusting to) driving behaviors that will present less accident risk and/or result in lower insurance premiums.

In FIG. 4A, using a first driver behavior chart 404, the user is presented with a chart that indicates the insurance premium per mile over a period of two week (shown here as beginning "8/15" and ending "8/29"). As shown in FIG. 4A, at first driver behavior chart 404, the driver's behavior on "8/15" and "8/17" resulted in the lowest insurance premium per mile, while the driver's behavior on "8/16" resulted in the highest insurance premium per mile. Similarly, as shown in FIG. 4A, in a second driver behavior chart 406, the driver's behavior during "May 2020" and "July 2020" resulted in the lowest insurance cost per month, while the driver's behavior during "June 2020" resulted in the highest insurance cost per month. In a further aspect, as shown in in FIG. 4A, in a third driver behavior chart 408, the driver's behavior of choosing to navigate safer routes instead of more risky routes during "May 2020" and "July 2020" resulted in the lowest insurance cost per month, while the driver's behavior of choosing to navigate risker routes instead of safer routes during "June 2020" resulted in the highest insurance cost per month. Other examples are possible.

For example, turning to FIG. 4B, FIG. 4B depicts the example graphical user interface 400 illustrated in a second state. In FIG. 4B, graphical user interface 400 displays driving trends dashboard 402 in a second state, which provides the user of the mobile computing device with one or more prompts to improve driving habits over one or more periods of time and/or for future trips, all of which may be based on the driving data described above in the context of FIGS. 2 and 3A-3D.

In FIG. 4B, using a personalized driving tips chart 410, the user is presented with one or more prompts to improve the driver's driving behavior, and thereby improve the safety of the driver and lower insurance premiums for the driver moving forward (shown here as "Slow down on Highway 55—Obeying the speed limit could save you $27.43 per month," "Avoid Dangerous Areas—Both 25th Street and 3rd Street are dangerous during your typical commute—use alternate route to save up to $11.15 per month," "Merge at Correct Speed—Based on our analysis, you typically merge at an average of 5 miles per hour under the speed limit, which increases risk of collisions—merge close to the speed limit to save up to $10 per month"). Other examples are possible, any or all of which may be personalized for one or more particular drivers based on driving data and/or driver behavior data described above in the context of, for example, FIGS. 2 and 3A-3D.

As also shown in FIG. 4B, the user may be presented with risky trips prompt 412 to review the "risky" trips caused by certain driver behavior, which may have resulted in the higher insurance premiums per mile and/or month.

For example, turning to FIG. 4C, FIG. 4C depicts the example graphical user interface 400 illustrated in a third state. In FIG. 4C, graphical user interface 400 displays driving trends dashboard 402 in a third state, which provides the user of the mobile computing device with one or more prompts to improve driving habits for one or more particularly risky routes for future trips, all of which may be based on the driving data described above in the context of FIGS. 2 and 3A-3D.

In FIG. 4C, using a personalized driving tips chart 414, the user is presented with one or more prompts to improve the driver's driving behavior on one or more particular routes and/or trips moving forward. As shown in FIG. 4C, example graphical user interface 400 may display a prompt to "Classify Trips—We have identified the following typical trips from your driving history. Tap to name your trips and review suggested safer routes and schedules" and/or the collapsible menu items, each of which corresponds to a particular trip summary (such as those discussed above in the context of FIG. 3D and illustrated in FIG. 4C as trip summary 416) and each of which may be expanded and/or collapsed—for example, using the triangle icon at the end each trip summary icon.

In a further aspect, the information displayed for each trip summary 416 may display historical trends and data associated with each trip, as well as projected data associated with each trip moving forward, all of which may be updated in real time (e.g., based on updated sensor data and/or environmental data of vehicles and/or sensors operating within the area) and/or recursively regenerated accident risk models for the areas along the trip, among other possibilities. For example, graphical user interface 400 may provide information pertaining to one or more past trips, including duration and insurance costs associated with previous trips, all of which may be displayed in manner similar to the information displayed via trip summary 416, for example, as shown in the example embodiment of FIG. 3D. Other examples and/or additional information and prompts for display via graphical user interface 400 are possible.

For example, as also shown in FIG. 4C, the user may be presented with an additional trips prompt 418 to review the information and/or suggestions for other trips indicating certain driver behavior, which may have resulted in lower or higher insurance premiums per mile and/or month.

These example graphical user interfaces are merely for purposes of illustration. The features described herein may involve graphical user interfaces that are configured or formatted differently, include more or less information and/or additional or fewer instructions, include different types of information and/or instructions, and relate to one another in different ways.

D. Example Method

Figure 5:
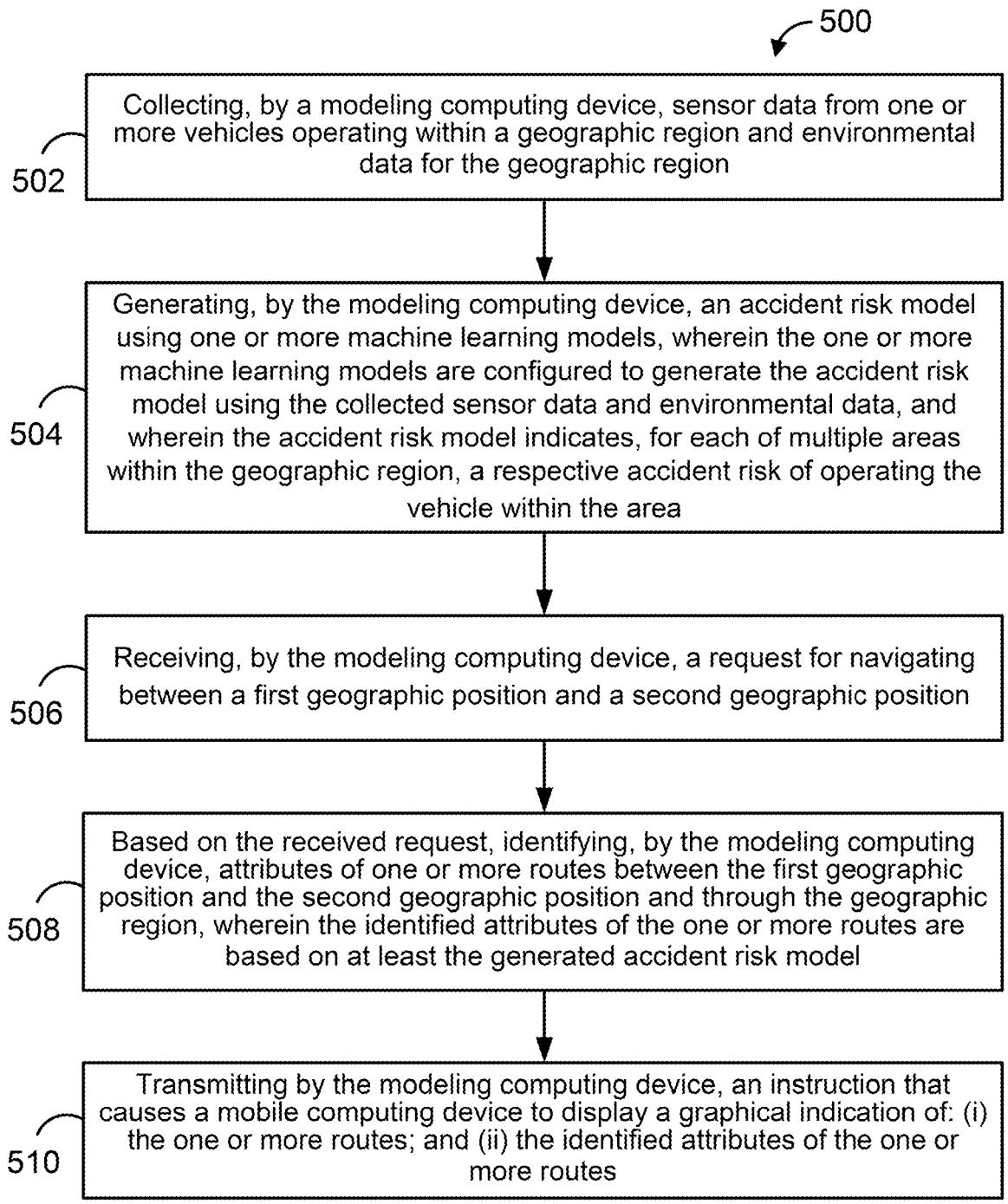
FIG. 5 is a flow chart of an example method.

FIG. 5 is a flow chart illustrating an example method 500.

At block 502, the method 500 can include, collecting, by a modeling computing device, sensor data from one or more vehicles operating within a geographic region and environmental data for the geographic region. In some examples, the sensor data from the one or more vehicles comprises data from one or more of the following sensors: (i) GPS sensor; (ii) accelerometer sensor; (iii) weather sensor; (iv) collision sensor; and (v) camera sensor. In other examples, the environmental data comprises one or more of the following: (i) weather data; (ii) traffic data; (iii) accident data; (iv) time data; (v) map data; (vi) road condition data; and (vii) camera data.

At block 504, the method 500 can include, generating, by the modeling computing device, an accident risk model using one or more machine learning models, wherein the one or more machine learning models are configured to generate the accident risk model using the collected sensor data and environmental data, and wherein the accident risk model indicates, for each of multiple areas within the geographic region, a respective accident risk of operating the vehicle within the area. In some examples, the one or more machine learning models comprises a naïve Bayes classifier machine learning model. In other examples, the one or more machine learning models comprises a deep learning model. In still other examples, the one or more machine learning models comprises a gradient boosting regression model.

At block 506, the method 500 can include receiving, by the modeling computing device, a request for navigating between a first geographic position and a second geographic position. In some examples, receiving a request for navigating between a first geographic position and a second geographic position comprises receiving a request for navigating between a first geographic position and a second geographic position from the mobile computing device. In some examples the first geographic position and the second geographic position are within the geographic region.

At block 508, the method 500 can also include, based on the received request, identifying, by the modeling computing device, attributes of one or more routes between the first geographic position and the second geographic position and through the geographic region, wherein the identified attributes of the one or more routes are based on at least the generated accident risk model. In other examples, the attributes of one or more routes comprise risk associated with navigating each of the one or more routes. In other examples, the attributes of one or more routes comprise insurance premiums associated with navigating each of the one or more routes.

At block 510, the method 500 can also include, transmitting by the modeling computing device, an instruction that causes a mobile computing device to display a graphical indication of: (i) the one or more routes; and (ii) the identified attributes of the one or more routes. In other examples, displaying a graphical indication of the identified attributes of the one or more routes comprises displaying, via the user interface of the mobile computing device, one or more graphical indications of the risk associated with navigating each of the one or more routes. In other examples, displaying a graphical indication of the identified attributes of the one or more routes comprises displaying, via the user interface of the mobile computing device, one or more graphical indications of the insurance premiums associated with navigating each of the one or more routes.

In other examples embodiments, the method 500 includes receiving, by the modeling computing device, from the mobile computing device, geolocation information, wherein the geolocation information is based on the geolocation of the mobile computing device, and based on the received geolocation information, identifying, by the modeling computing device, updated risk associated with navigating at least one of the one or more routes, wherein the updated risk associated with navigating at least one of the one or more routes is based on at least the generated accident risk model, and displaying, via the user interface of the mobile computing device, a graphical indication of the updated risk associated with navigating at least one of the one or more routes.

In other examples embodiments, the method 500 includes receiving, by the modeling computing device, from the mobile computing device, geolocation information, wherein the geolocation information is based on the geolocation of the mobile computing device, and based on the received geolocation information, identifying, by the modeling computing device, updated insurance premiums associated with navigating at least one of the one or more routes, wherein the updated insurance premiums associated with navigating at least one of the one or more routes is based on at least the generated accident risk model, and displaying, via the user interface of the mobile computing device, a graphical indication of the updated insurance premiums associated with navigating at least one of the one or more routes.

In other examples embodiments, the method 500 includes receiving, by the modeling computing device, from the mobile computing device, driver behavior data, wherein the driver behavior data is detected by the mobile computing device during operation of the vehicle, and based on the driver behavior data, identifying, by the modeling computing device, suggestion prompt associated with navigating at least one of the one or more routes, wherein the suggestion prompt associated with navigating at least one of the one or more routes is based on at least the generated accident risk model, and displaying, via the user interface of the mobile computing device, a graphical indication of the suggestion prompt associated with navigating at least one of the one or more routes. In other examples, the driver behavior data detected by the mobile computing device during operation of the vehicle comprises data from one or more of the following sensors of the mobile computing device: (i) GPS sensor; (ii) accelerometer sensor; (iii) time sensor; (iv) camera sensor; and (v) device interaction sensor. In some examples, the suggestion prompt comprises a prompt to choose a particular route of the one or more routes. In other examples, the suggestion prompt comprises a prompt to choose a particular time to navigate at least one of the one or more routes. In still other examples, the suggestion prompt comprises a prompt to alter driver behavior when navigating the at least one of the one or more routes.

III. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A navigation system configured for use with a vehicle, the navigation system comprising:
   a modeling computing device, wherein the modeling computing device comprises a processor and a non-transitory computer-readable medium, having stored thereon program instructions that, upon execution by the processor, cause the modeling computing device to perform a set of operations comprising:
      collecting sensor data from sensors attached to a plurality of vehicles operating within a geographic region and environmental data for the geographic region, wherein collecting the sensor data comprises:
         collecting first sensor data from a first sensor attached to a first vehicle of the plurality of vehicles; and
         collecting second sensor data from a second sensor attached to a second vehicle of the plurality of vehicles;
      generating an accident risk model using one or more machine learning models, wherein the one or more machine learning models are configured to generate the accident risk model using the collected sensor data and environmental data, and wherein the accident risk model indicates, for each of multiple areas within the geographic region, a respective accident risk of operating the vehicle within the area;
      receiving a request for navigating between a first geographic position and a second geographic position; and
      based on the received request, identifying attributes of a plurality of portions of a plurality of routes between the first geographic position and the second geographic position and through the geographic region, wherein the identified attributes of the plurality of portions of the plurality of routes are based on at least the generated accident risk model; and
   a mobile computing device, wherein the mobile computing device comprises a processor and a non-transitory computer-readable medium, having stored thereon program instructions that, upon execution by the processor, cause the mobile computing device to perform a set of operations comprising:
      receiving, from the modeling computing device, the identified attributes of the plurality of portions of the plurality of routes;
      displaying, via a user interface of the mobile computing device, a graphical indication of: (i) the plurality of portions of the plurality of routes; and (ii) the identified attributes of the plurality of portions of the plurality of routes;
      displaying, via a user interface of the mobile computing device, a first suggestion prompt to choose a particular time to navigate at least one of the plurality of routes;
      while the vehicle is navigating along a route of the plurality of routes, transmitting, by the mobile computing device, to the modeling computing device, driver behavior data associated with a driver of the vehicle, wherein the driver behavior data is collected by the mobile computing device during operation of the vehicle along the route, and wherein the driver behavior data comprises data collected by the mobile computing device from one or more behavioral data groups;
      based on the transmitted driver behavior data, receiving, from the modeling computing device, a second suggestion prompt associated with navigating a particular route of the plurality of routes, wherein the second suggestion prompt associated with navigating the particular route of the plurality of routes is based on updating the generated accident risk model with the transmitted driver behavior data; and
      displaying, via the user interface of the mobile computing device, a graphical indication of the second suggestion prompt associated with navigating the particular route of the plurality of routes.

2. The navigation system of claim 1, wherein the sensor data from the plurality of vehicles comprises data from one or more of the following sensors: (i) GPS sensor; (ii) accelerometer sensor; (iii) weather sensor; (iv) collision sensor; and (v) camera sensor.

3. The navigation system of claim 1, wherein the environmental data comprises one or more of the following: (i) weather data; (ii) traffic data; (iii) accident data; (iv) time data; (v) map data; (vi) road condition data; and (vii) camera data.

4. The navigation system of claim 1, wherein the one or more machine learning models comprises a naïve Bayes classifier machine learning model.

5. The navigation system of claim 1, wherein the one or more machine learning models comprises a deep learning model.

6. The navigation system of claim 1, wherein the one or more machine learning models comprises a gradient boosting regression model.

7. The navigation system of claim 1, wherein receiving a request for navigating between a first geographic position and a second geographic position comprises receiving a request for navigating between a first geographic position and a second geographic position from the mobile computing device.

8. The navigation system of claim 1, wherein the first geographic position and the second geographic position are within the geographic region.

9. The navigation system of claim 1, wherein the attributes of one or more of the plurality of portions of the plurality of routes comprise risk associated with navigating each of the one or more of the plurality of portions of the plurality of routes, and wherein displaying a graphical indication of the identified attributes of the one or more of the plurality of portions of the plurality of routes comprises displaying, via the user interface of the mobile computing device, one or more graphical indications of the risk associated with navigating each of the one or more of the plurality of portions of the plurality of routes.

10. The navigation system of claim 9, wherein the set of operations further comprise:
receiving, by the modeling computing device, from the mobile computing device, geolocation information, wherein the geolocation information is based on a geolocation of the mobile computing device;
based on the received geolocation information, identifying, by the modeling computing device, updated risk associated with navigating at least one of the plurality of portions of the plurality of routes, wherein the updated risk associated with navigating at least one of the plurality of portions of the plurality of routes is based on at least the generated accident risk model; and
displaying, via the user interface of the mobile computing device, a graphical indication of the updated risk associated with navigating at least one of the plurality of portions of the plurality of routes.

11. The navigation system of claim 1, wherein the attributes of one or more of the plurality of portions of the plurality of routes comprise insurance premiums associated with navigating each of the one or more routes, and wherein displaying a graphical indication of the identified attributes of the one or more of the plurality of portions of the plurality of routes comprises displaying, via the user interface of the mobile computing device, one or more graphical indications of the insurance premiums associated with navigating each of the one or more of the plurality of portions of the plurality of routes.

12. The navigation system of claim 11, wherein the set of operations further comprise:
receiving, by the modeling computing device, from the computing device, geolocation information, wherein the geolocation information is based on a geolocation of the mobile computing device;
based on the received geolocation information, identifying, by the modeling computing device, updated insurance premiums associated with navigating at least one of the plurality of portions of the plurality of routes, wherein the updated insurance premiums associated with navigating at least one of the plurality of portions of the plurality of routes is based on at least the generated accident risk model; and
displaying, via the user interface of the mobile computing device, a graphical indication of the updated insurance premiums associated with navigating at least one of the plurality of portions of the plurality of routes.

13. The navigation system of claim 1, wherein the driver behavior data detected by the mobile computing device during operation of at least one of the plurality of vehicles comprises data from one or more of the following sensors of the mobile computing device: (i) GPS sensor; (ii) accelerometer sensor; (iii) time sensor; (iv) camera sensor; and (v) device interaction sensor.

14. The navigation system of claim 1, wherein the second suggestion prompt comprises a prompt to alter driver behavior when navigating at least one of the plurality of routes.

15. The navigation system of claim 1, wherein the one or more behavioral data groups comprises a group of intrinsic driver behaviors, wherein the group of intrinsic driver behaviors comprises: (i) driver intoxication; (ii) driver sleepiness; (iii) driver attentiveness to a road; and (iv) physical interactions by the driver with the mobile computing device or other devices within the vehicle.

16. The navigation system of claim 1, wherein the one or more behavioral data groups comprises a group of intrinsic vehicle behaviors, wherein the group of intrinsic vehicle behaviors comprises: (i) swerving; (ii) acceleration patterns; and (iii) speeding.

17. The navigation system of claim 1, wherein the one or more behavioral data group s comprises a group of logistical behaviors, wherein the group of logistical behaviors comprises: (i) choice of route; (ii) choice of departure time; and (iii) route changes made in response to recommendations from the modeling computing device.

18. The navigation system of claim 1, wherein the first suggestion prompt comprises a plurality of different departure times associated with each of the plurality of routes.

19. The navigation system of claim 18, wherein the first suggestion prompt further comprises displaying a route duration and an insurance premium associated with each of the plurality of different departure times associated with each of the plurality of routes.

20. The navigation system of claim 1, wherein the first sensor data indicates conditions inside the first vehicle and wherein the second sensor data indicates conditions inside the second vehicle.

21. A method of navigating a vehicle comprising:
collecting, by a modeling computing device, sensor data from sensors attached to a plurality of vehicles operating within a geographic region and environmental data for the geographic region, wherein collecting the sensor data comprises:
collecting first sensor data from a first sensor attached to a first vehicle of the plurality of vehicles; and
collecting second sensor data from a second sensor attached to a second vehicle of the plurality of vehicles;
generating, by the modeling computing device, an accident risk model using one or more machine learning models, wherein the one or more machine learning models are configured to generate the accident risk model using the collected sensor data and environmental data, and wherein the accident risk model indicates, for each of multiple areas within the geographic region, a respective accident risk of operating the vehicle within the area;

receiving, by the modeling computing device, a request for navigating between a first geographic position and a second geographic position;

based on the received request, identifying, by the modeling computing device, attributes of a plurality of portions of a plurality of routes between the first geographic position and the second geographic position and through the geographic region, wherein the identified attributes of the plurality of portions of the plurality of routes are based on at least the generated accident risk model;

transmitting by the modeling computing device, an instruction that causes a mobile computing device to display a graphical indication of: (i) the plurality of portions of the plurality of routes; and (ii) the identified attributes of the plurality of portions of the plurality of routes;

transmitting by the modeling computing device, an instruction that causes a mobile computing device to display a graphical indication of a first suggestion prompt to choose a particular time to navigate at least one of the plurality of routes;

while the vehicle is navigating along a route of the plurality of routes, receiving driver behavior data associated with a driver of the vehicle, wherein the driver behavior data is collected by the mobile computing device during operation of the vehicle along the route, and wherein the driver behavior data comprises data collected by the mobile computing device from one or more behavioral data groups;

based on the transmitted driver behavior data, generating a second suggestion prompt associated with navigating a particular route of the plurality of routes, wherein the second suggestion prompt associated with navigating the particular route of the plurality of routes is based on updating the generated accident risk model with the transmitted driver behavior data; and transmitting by the modeling computing device, an additional instruction that causes the mobile computing device to display a graphical indication of the second suggestion prompt associated with navigating the particular route of the plurality of routes.

22. The method of claim 21, wherein the environmental data comprises one or more of the following: (i) weather data; (ii) traffic data; (iii) accident data; (iv) time data; (v) map data; (vi) road condition data; and (vii) camera data.

* * * * *